United States Patent [19]
Lipscomb

[11] Patent Number: 5,872,626
[45] Date of Patent: Feb. 16, 1999

[54] CONSOLIDATED LASER ALIGNMENT AND TEST STATION

[75] Inventor: Derrell Lipscomb, Windermere, Fla.

[73] Assignee: Lockheed Martin Corporation, Bethesda, Md.

[21] Appl. No.: 931,289

[22] Filed: Sep. 16, 1997

[51] Int. Cl.⁶ .............................. G01C 25/00; G01C 3/08; G01B 11/26

[52] U.S. Cl. .......................... 356/141.3; 356/4.02; 356/6; 356/152.1

[58] Field of Search .................. 356/6, 4.02, 152.1, 356/141.3

[56] References Cited

U.S. PATENT DOCUMENTS

| | | |
|---|---|---|
| 3,923,400 | 12/1975 | Hardy . |
| 3,999,858 | 12/1976 | Herquist ............................... 356/141.3 |
| 4,320,462 | 3/1982 | Lund et al. . |
| 4,422,758 | 12/1983 | Godfrey et al. ........................ 356/4.02 |
| 4,432,640 | 2/1984 | Grage et al. .......................... 356/141.3 |
| 4,626,685 | 12/1986 | Pitalo et al. . |
| 4,693,600 | 9/1987 | Cross et al. . |
| 4,867,560 | 9/1989 | Kunitsugu ............................. 356/141.3 |
| 4,896,032 | 1/1990 | Ball et al. . |
| 4,975,573 | 12/1990 | Girard . |
| 5,009,502 | 4/1991 | Shih et al. . |
| 5,020,074 | 5/1991 | Lerfald . |
| 5,042,950 | 8/1991 | Salmon, Jr. . |
| 5,065,005 | 11/1991 | Encaou et al. ........................ 250/206.2 |
| 5,264,905 | 11/1993 | Cavanagh et al. . |
| 5,281,813 | 1/1994 | Shih . |
| 5,282,014 | 1/1994 | Ruhl, Jr. et al. . |

*Primary Examiner*—Stephen C. Buczinski
*Attorney, Agent, or Firm*—Burns, Doane, Swecker & Mathis, L.L.P.

[57] ABSTRACT

A consolidated laser alignment and test station. In exemplary embodiments, equipment sufficient to perform complete dynamic testing and alignment of a laser transceiver unit is provided in one compact arrangement. As a result, cavity-box efficiency testing, dynamic open-interferometer alignment, dynamic open-case alignment, closed-case laser boresighting, and complete laser functionality and diagnostic testing can be carried out efficiently at a single location. Real-time diagnostic feedback relating to beam quality, radiometry, and temporal behavior is provided so that high-precision laser alignments and repairs can be made quickly and cost effectively. Customized test fixtures provide easy access to every level of the transceiver unit under test, and two cameras provide far-field, near-field, wide-field and receiver-field beam viewing. One camera is combined with a pin-hole lens and a quad step-filter optic attenuator to provide a wide-field beamfinder assembly enabling an operator to quickly align the laser under test to the narrower field of the second (diagnostic) camera. The second camera provides near-field and far-field beam viewing, while a radiometer and a pulse detector provide additional diagnostic information. The beamfinder assembly also provides receiver-field laser viewing for receiver-path boresight adjustments. In an exemplary embodiment, the beamfinder assembly includes a quad step-filter constructed from circular wedge filters.

47 Claims, 17 Drawing Sheets

CONSOLIDATED LASER ALIGNMENT AND TEST STATION

BACKGROUND OF THE INVENTION

The present invention relates to laser transceivers, and more particularly to methods and apparatus for testing, aligning, and refurbishing laser transceivers.

Today, laser radar (LADAR) and other systems incorporating laser transmit-and-receive devices are in widespread use. For example, laser transceivers are routinely employed in military applications for such purposes as target detection, acquisition, identification and tracking. However, due to the inherent high-precision nature of laser systems, testing and alignment of laser transceiver units can be difficult. Indeed, except for the simple adjustment of transceiver mounting screws or the wholesale replacement of peripheral receiver assemblies, failed laser transceivers are conventionally returned to the transceiver supplier for repair and maintenance. The supplier can provide both the facilities and the skill required to carry out high-precision laser alignment and testing.

However, because the delays associated with shipping a laser transceiver unit to and from an appropriate supplier can be quite long, and because laser system suppliers typically have significant repair backlogs, conventional laser transceiver repair and maintenance is extremely costly in terms of both time and money. As a result, laser system users often keep a large number of laser transceiver spares on hand. The cost of doing so, however, can be prohibitive. Thus, there is a need for improved methods and apparatus for testing, aligning and refurbishing laser transceivers. In particular, there is a need for methods and apparatus allowing a relatively unskilled technician, who can be located nearer the system user, to perform advanced laser maintenance and refurbishment. Such methods and apparatus will yield significant improvements in terms of laser repair cost and turnaround time and will greatly enhance user self-sufficiency.

SUMMARY OF THE INVENTION

The present invention fulfills the above-described and other needs by providing a consolidated laser alignment and test station which enables a technician having relatively little specialized training to quickly perform advanced laser repair and maintenance procedures. The test station utilizes recent developments in electro-optic technologies to put all of the resources necessary for dynamically testing and aligning a laser transceiver unit within arm's reach of a single operator. Thus, the test station provides a high level of system repair through-put at significantly reduced cost.

In exemplary embodiments, equipment sufficient to dynamically test and align NdYAG laser transceiver units is provided on a single compact bench. Thus; according to the present invention, cavity-box efficiency testing, dynamic open-interferometer alignment, dynamic open-case alignment, closed-case laser boresighting, and complete laser functionality and diagnostic testing can be carried out at a single station. Real-time user feedback is provided so that high-precision laser alignments and repairs can be made quickly and cost effectively.

According to the present invention, a customized test fixture is used to mount the cavity box and interferometer of a laser transceiver unit under test to the test station bench. Thus, the cavity box and interferometer are mounted external to the laser transceiver unit case so that full-access laser-optics adjustments can be made. Additionally, a virtual laser bed fixture can be mounted in place of the laser transceiver unit interferometer to permit direct testing of the cavity box assembly itself. Furthermore, the entire closed-case laser transceiver unit can be mounted on the test station bench for final adjustments and boresighting of the laser transmitter and receiver. Generally, laser transceiver unit laser-optics adjustments are made while critical laser functions are simultaneously monitored via discrete test station readouts relating to beam quality, radiometry, and temporal behavior.

In exemplary embodiments, two cameras provide far-field, near-field, wide-field and receiver-field beam viewing. The novel two-camera combination allows a test station operator to efficiently view, measure, analyze and adjust a laser transceiver unit at all levels of operation. One of the cameras is combined with a pin-hole lens and a quad step-filter optic attenuator to form a wide-field beamfinder assembly. Using the beamfinder assembly in conjunction with self-contained alignment optics included with the text fixtures described above, a test station operator can quickly align the laser to the second camera. The second camera then provides both near-field and far-field beam viewing, while a radiometer and a pulse detector provide additional diagnostics. In exemplary embodiments, the beamfinder assembly also provides receiver-field laser viewing to allow for rapid boresight adjustments.

Advantageously, the modular and highly flexible design of the test station allows it to be rapidly reconfigured to align and test a wide variety of laser transceiver units. For example, with appropriate optic interface fixtures and suitable cameras, the test station can accommodate NdYAG lasers operating at 1.064 $\mu$m, 0.532 $\mu$m, or 1.54 $\mu$m (Raman or wavelength shifted 1.064 $\mu$m) wave-lengths. Additionally, dual wavelength lasers (i.e., 1.5/1.064 $\mu$m) can be aligned and tested using an appropriate collimator mirror and bolt-in dual-camera modules. Radiometry and image processing components of the test station automatically reconfigure to the laser transceiver unit under test. Because virtually any dynamic adjustment of a laser transceiver unit under test can be performed at a single test station, laser testing and alignment can be conducted in a quick and cost-effective manner. Additionally, because the test station diagnostics provide straightforward real-time feedback, laser repair and maintenance can be achieved by a relatively inexperienced technician.

The above described and additional features of the present invention are explained in greater detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE PREFERRED EMBODIMENTS

A typical laser transceiver unit comprises three major subsystems including a) a laser electronics unit, b) a laser interferometer and c) a cooling system. Generally speaking, the laser electronics unit provides power-supply and timing-control signals to the interferometer which in turn establishes the pulse shape, pulse width, beam spread and spectral content of the beam transmitted by the laser transceiver unit. The cooling system dissipates heat which is generated within the laser transceiver unit, for example by the power supply or by a triggered light source within the interferometer. The basic layout and operating characteristics of a laser interferometer are described below. Laser electronics units and cooling units are well known in the art and a detailed description of such systems is not necessary for an understanding of the present invention.

Figure 1:
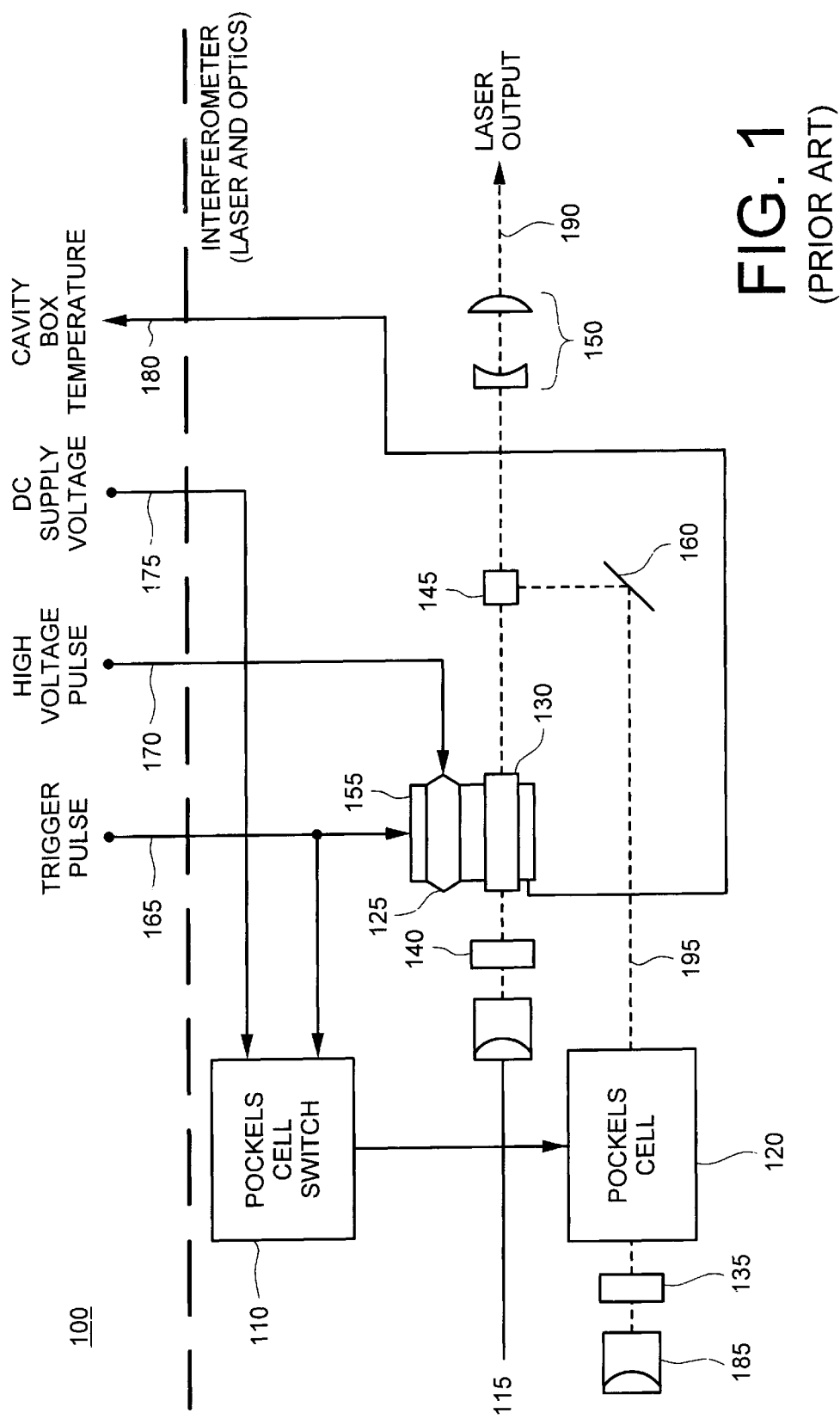
FIG. 1 is a high-level block diagram of an exemplary interferometer of the type found within laser transceiver units that can be tested and aligned using the methods and apparatus of the present invention.

FIG. 1 is a high level block diagram of an interferometer 100 of the type found in laser transceiver units which may be tested and aligned according to the teachings of the present invention. As shown, the exemplary interferometer 100 includes a switch 110 for controlling a Pockels cell 120, a first terminating mirror 115, a first wave plate 140, a cavity box 155 (including a flashlamp 125 and a laser rod 130), a beam splitter 145, a pair of lenses 150, a second wave plate 135, a corner reflector 160 and a second terminating mirror 185. In practice, each component of the interferometer 100 is mounted on a rigid base (not shown) to form a self-contained interferometer sub-assembly which can be mounted within a laser transceiver unit.

In FIG. 1, a first interferometer input 165 (labeled Trigger Pulse in the figure) is coupled to a first input of the Pockels cell switch 110 and to an input of the cavity box 155. Additionally, a second interferometer input 170 (labeled High Voltage Pulse) is coupled to an input of the flashlamp 125, and a third interferometer input 175 (labeled DC Supply Voltage) is coupled to a second input of the Pockels cell switch 110. An output of the cavity box 155 serves as an interferometer output 180 (labeled Cavity Box Temperature). As shown, the first terminating mirror 115, the first wave plate 140, the laser rod 130, the beam splitter 145 and the pair of lenses 150 are arranged to form a first optical path 190. At the same time, the first terminating mirror 115, the first wave plate 140, the laser rod 130, the beam splitter 145, the corner reflector 160, the Pockels cell 120, the second wave plate 135 and the second terminating mirror 185 are arranged to form a second optical path 195.

In operation, a pulse forming network (not shown) is used to convert a relatively low-current, high-voltage (on the order of 1 kV) supply to a much higher current pulse which is used to supply the flashlamp 125 via the second interferometer input 170. At the same time, a trigger generator (not shown) is used to control the flashlamp 125 via the first interferometer input 165 so that the flashlamp 125 emits triggered pulses of non-coherent radiation which in turn stimulate pulsed laser emissions within the laser rod 130. A portion of the emitted laser beam follows the first optical path 190 and serves as the laser output for the laser transceiver unit in which the interferometer 100 is included. Another portion of the resulting laser beam follows the second optical path 195 and causes the laser to resonate (as the beam is reflected back and forth between the terminating mirrors 115, 185), and to thereby maximize lasing efficiency, as is well known in the art. The interferometer output 180 provides a measure of cavity box temperature, for example to control a cooling unit.

Generally, the wave plates 140,135 are used to control polarization of the internal beam, and the pair of lenses 150 is used to collimate and focus the output beam. Additionally, a pair of wedged lenses or Risleys (not shown), which are typically mounted inside the laser transceiver unit casing and external to the interferometer itself, are used to fine-tune the direction of the laser output. The terminating mirrors 115, 185 allow the second optical path 195 to resonate, as noted above, and thereby intensify the resulting laser output. The optional Pockels cell 120 provides Q-switching for the resonator if it is desired. In other words, the controllable birefringence of the Pockels cell 120 is set to block the second optical path 195 and to thereby prevent the laser from resonating so that maximum energy is stored in the laser rod 130 prior to excitation of a laser pulse. Switching of the Pockels cell 120 is coordinated with the triggering of the flashlamp 125 via the Pockels cell switch 110. As shown, the Pockels cell switch 110 receives the flashlamp trigger signal via the first interferometer input 165 as well as a DC supply voltage via the third interferometer input 175.

According to the present invention, a consolidated laser alignment and test station is used to assess and adjust the optics components of laser transceiver units containing interferometers such as that depicted in FIG. 1. Those skilled in the art will appreciate, however, that the exemplary interferometer 100 of FIG. 1 is provided merely to aid explanation of the present invention and that the test station of the present invention can be used to test and align a wide range with laser transceiver units containing various interferometer configurations. Additionally, though the detailed description below makes reference to particular physical embodiments of components of the present invention which are tailored to accommodate a particular type of laser transceiver unit containing a particular type of interferometer, those skilled in the art will recognize that equivalent embodiments can be constructed to accommodate any laser transceiver/interferometer combination of interest.

Figure 2:
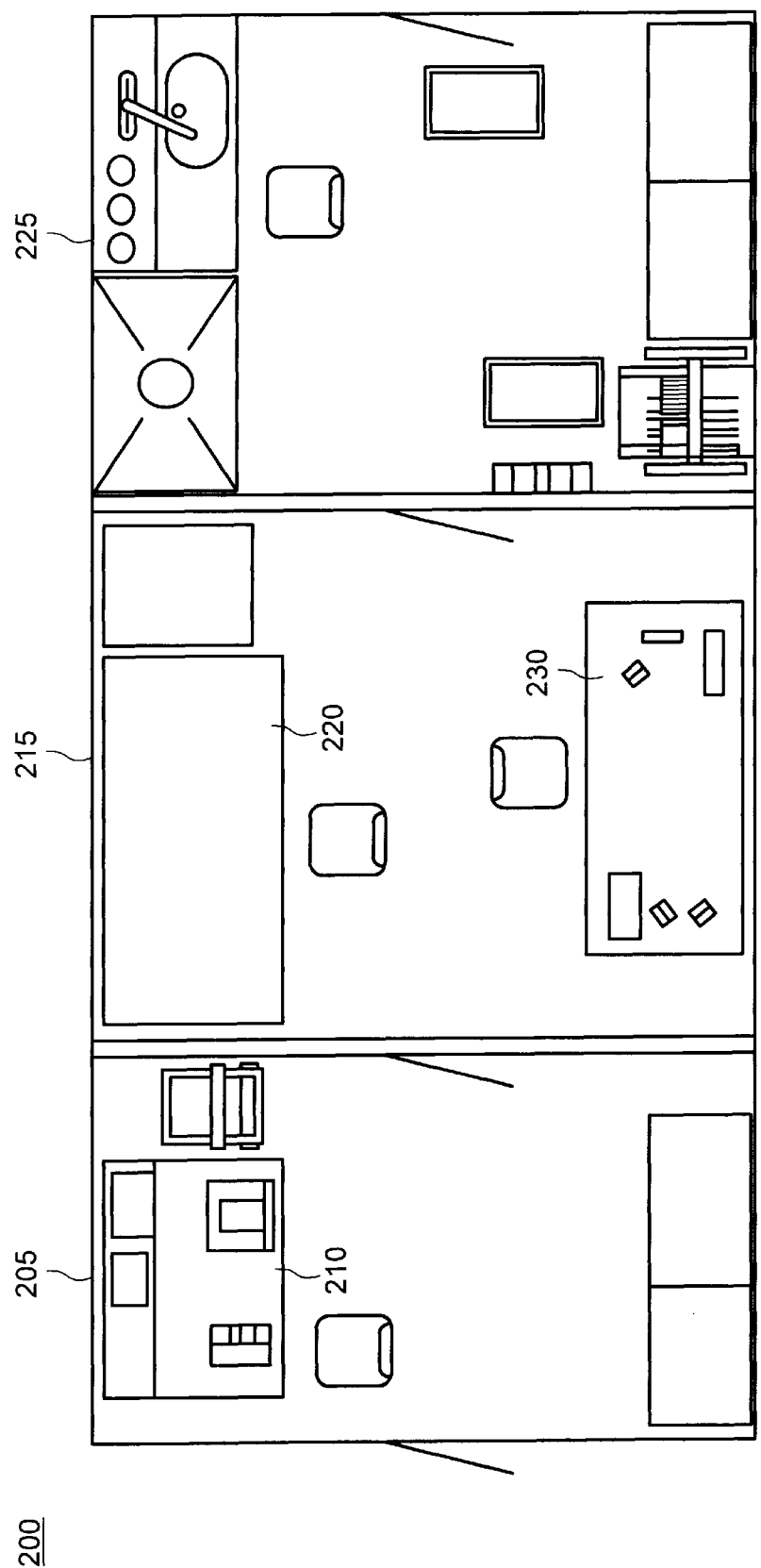
FIG. 2 is a conceptual diagram of an exemplary laser repair facility, incorporating a consolidated laser alignment and test station, constructed in accordance with one embodiment of the present invention.

FIG. 2 provides an overhead view of an exemplary laser repair facility 200 incorporating a test station 210 such as that taught by the present invention. In the exemplary laser repair facility 200, the test station 210 is situated proximate other laser transceiver unit repair equipment so that a laser transceiver unit (including the interferometer, laser electronics unit, cooling unit, outer chassis, etc.) can be fully tested and refurbished as necessary. As noted above, it may be advantageous to locate a laser repair facility close to the ultimate laser transceiver unit user, for example near troops in the field for military applications. Thus, the laser repair facility 200 of FIG. 2 may be constructed to fit within, for example, a mobile trailer.

As shown, the exemplary laser repair facility 200 comprises three rooms or work areas including first and second clean rooms 205, 215 and a cooling unit refurbishment area 225. The first clean room 205 includes an exemplary test station 210, and the second clean room 215 includes a tear-down bench 220 and a static alignment bench 230. Generally, the first clean-room 205 is used to dynamically test and align the optics portions of the laser transceiver unit, and the second clean room 215 is used for laser transceiver unit tear-down, optics inspection, optics cleaning and bonding, and static alignment of the interferometer. The cooling unit refurbishment area 225 is used to decontaminate and refurbish the laser transceiver unit cavity box and cooling system sub-assemblies as necessary.

In operation, an incoming laser transceiver unit is first tested on the test station 210 while it is operating to obtain data on the laser transceiver unit performance and to perform a preliminary diagnosis of any detected failures. Following confirmation of a laser failure, the laser transceiver unit is moved to the tear-down bench 220 where the cavity box and cooling unit assemblies are removed and taken to the cooling unit refurbishment area 225. There the cooling unit and cavity box assemblies are tested and refurbished as necessary (e.g., replacement of faulty cavity box reflectors, cleaning and replacement of the laser rod, replacement of liquid coolant, etc.). Preferably at the same time, the interferometer optics are cleaned and any unserviceable optics components are replaced at the tear-down bench 220. Thereafter, the interferometer is statically realigned at the static alignment bench 230, and laser electronics unit repairs and any upgrades or retrofit incorporations are performed as necessary. Once cleaning, refurbishment and static alignment are complete, the laser transceiver unit sub-assemblies are re-integrated, dynamically aligned, boresighted, and final-tested using the test station 210.

In exemplary embodiments, a depot repair form is generated (e.g., within a laser repair facility computerized data base) when a laser transceiver unit first enters the laser repair facility 200. The depot repair form is then continually updated throughout the laser transceiver unit repair process to document the repair and maintenance history of the particular laser transceiver unit. If appropriate, the completed depot repair form is downloaded to a central computerized laser transceiver unit tracking system (not shown). Those skilled in the art will appreciate that the brief description of the exemplary laser repair facility 200 provided above is intended to further understanding of the present invention and that the beneficial aspects of the test station embodiments described in detail below are equally applicable to any form of laser repair facility.

Figure 3:
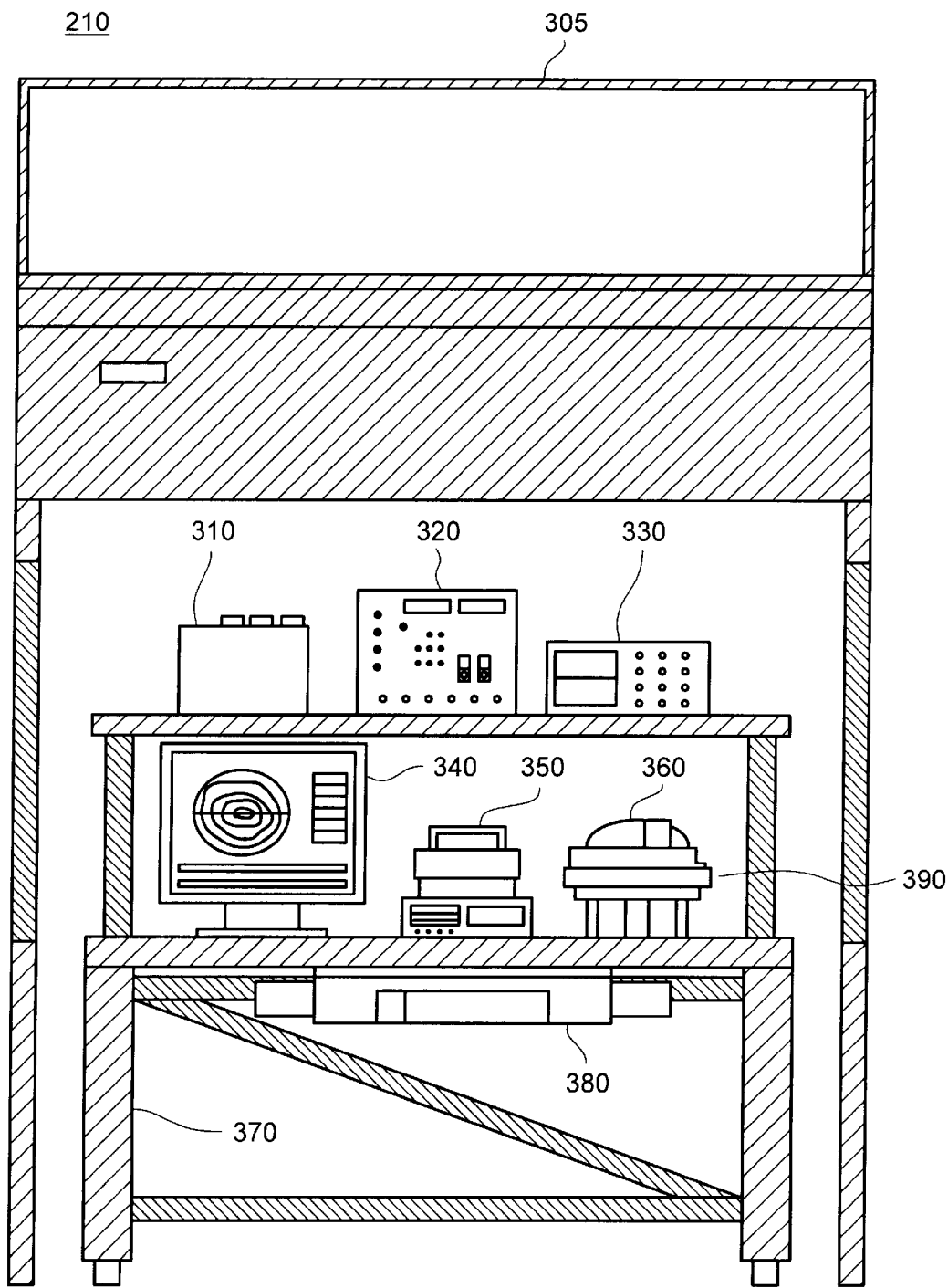
FIG. 3 is a conceptual diagram of an exemplary test station constructed in accordance with the teachings of the present invention.

FIG. 3 is a conceptual diagram showing the basic components of the exemplary test station 210. As shown, the exemplary test station 210 comprises a hood 305 and a test bench 370. The test bench 370 includes a test platform 390 and a light-tight beam housing 380. In FIG. 3, a laser electronics unit 310, a laser run box 320, a waveform display unit 330, a display monitor 340 and a radiometer display unit 350 are positioned on the bench 370. Additionally, a laser transceiver unit under test 360 is mounted on the test platform 390.

Generally, the laser electronics unit 310 and the laser run box 320 are used to provide power and control signals to the laser transceiver unit 360 just as they would be provided to the laser transceiver unit 360 during operation in the field. The laser transceiver unit 360, or a sub-assembly of the laser transceiver unit 360 (e.g., the interferometer), is fired through apertures in the testing platform 390 and the top portion of the test bench 370 and into the beam housing 380. As described below, laser measurement equipment attached to the beam housing 380 is used to provide a test station operator with real-time diagnostic information relating to the beam emitted by the laser transceiver unit 360. The diagnostic information is provided to the test station operator via the waveform display unit 330, the display monitor 340 and the radiometer display unit 350 as described below. Using the real-time diagnostic feedback, the test station operator can quickly test and align the laser transceiver unit 360 (and the laser transceiver unit sub-assemblies) as necessary.

Figure 4:
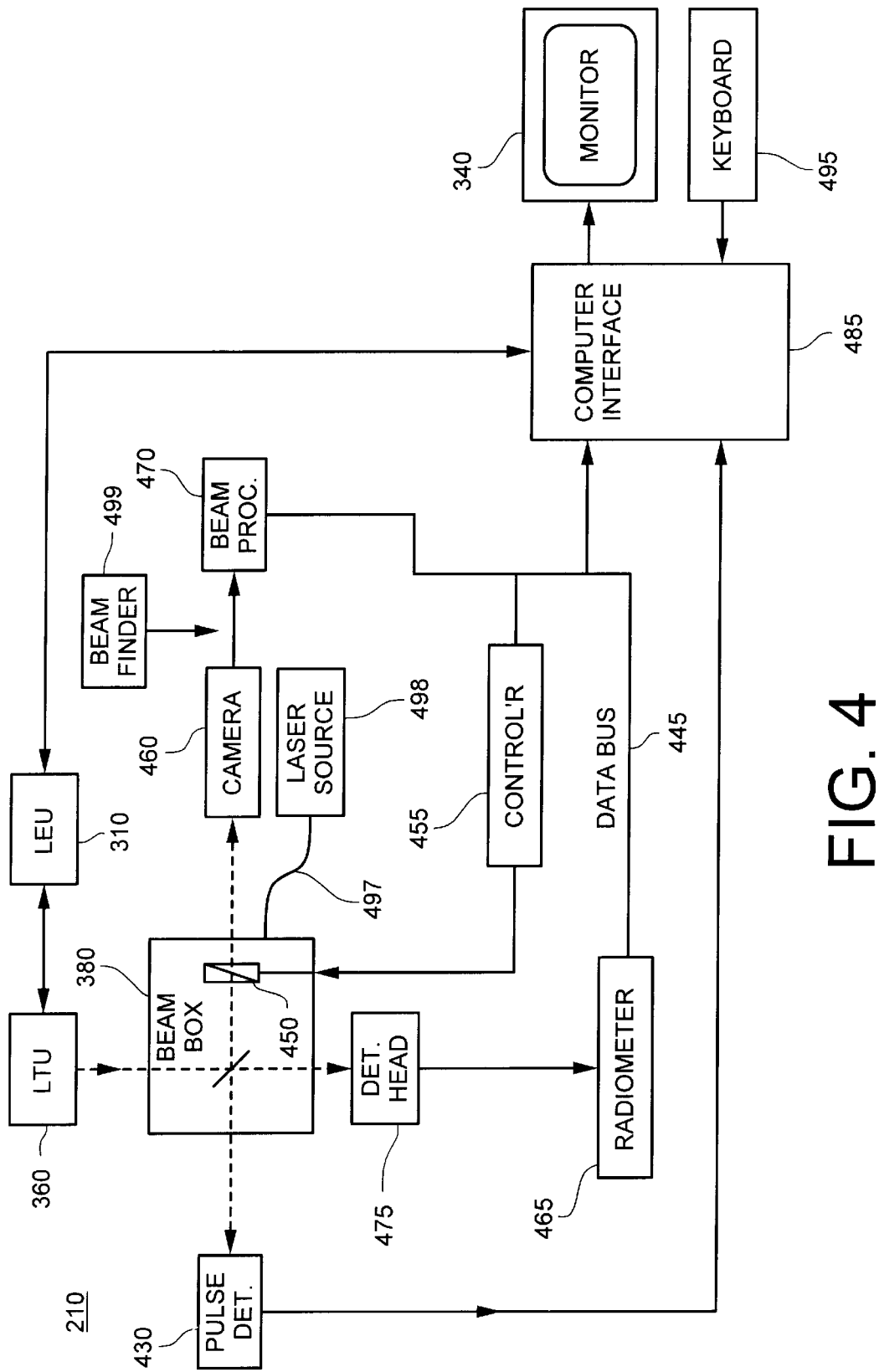
FIG. 4 is a block diagram of the basic components of an exemplary test station constructed in accordance with the teachings of the present invention.

FIG. 4 is a high-level schematic diagram showing electric and optic interconnections between components of the exemplary test station 210. As shown, the test station 210 includes the laser electronics unit 310, a pulse detector 430, the light-tight beam housing 380, an adjustable optical attenuator 450, a near/far field camera 460, a beamfinder camera 499, a beam processor 470, a laser source 498, the display monitor 340, a detector head 475, an attenuator controller 455, a radiometer 465, a data bus 445, a computer interface 485 and an input keyboard 495. As shown, the laser electronics unit 310 is bi-directionally coupled to a first input of the computer interface 485 and also bi-directionally coupled to an input of the transceiver unit under test 360. An optical output of the laser transceiver unit 360 is coupled to a first input of the beam housing 380.

First, second and third outputs of the beam housing 380 are optically coupled to inputs of the pulse detector 430, the detector head 475, and the camera 460 respectively. An electric output of the camera 460 is coupled to an input of the beam processor 470, and the beamfinder camera 499 is selectively positionable between the first camera 460 and the beam processor 470. An electric output of the attenuator controller 455 is coupled to an input of the adjustable optic attenuator 450, and an optical output of the laser source 498 is coupled to a second optical input of the beam housing 380 via a fiber optic cable 497. An electric output of the detector head 475 is coupled to an input of the radiometer 465, and an electric output of the pulse detector 430 is coupled to a second input of the computer interface 485. An output of the computer interface is coupled to an input of the display monitor 340, and an output of the keyboard 495 is coupled to a third input of the computer interface 485. The beam processor 470, the attenuator controller 455, the radiometer 465 and the computer interface 485 are all coupled via the data bus 445 which may be, for example, an IEEE 488 bus.

As described above, optical energy from the transceiver unit under test 360 is fired into the light-tight beam housing 380 and real-time diagnostic feedback is provided so that the test station operator can efficiently perform testing and alignment as necessary. The beam housing 380 contains two folded collimator paths which are integrated with (i.e., aligned with) the variable attenuator 450, the camera 460, the pulse detector 430, the detector head 475, the radiometer 465, and the laser source 498 (which may provide a boresight reference source and a receiver range testing source as described below). Generally, the camera 460 and the beam processor 470 provide detailed beam viewing, for example via the display monitor 340. Both near-field and far-field views can be displayed by switching between the two folded collimator paths within the beam housing 380 as described below.

The detector head 475 and the radiometer 465 provide beam energy diagnostics (e.g., via the radiometer display unit 350), and the pulse detector 430 provides laser pulse waveform diagnostics (e.g., via the waveform display unit 330 which may comprise an oscilloscope). The variable attenuator 450 is used to set saturation levels for the camera 460. The computer interface 485 provides central control of the test station components, user prompting at appropriate points in the test and alignment process, and detailed data processing and management.

In exemplary embodiments, the digital image processor 470 provides real-time far-field divergence optimization and measurement over a range of 250 $\mu$R to 2.0 mR, radiation outside the main beam, near-field beam viewing including profile top-hat and isometric, and boresight alignment and measurement. Additionally, the radiometer 465 output provides energy per pulse with 2% accuracy, average power from 20 mW to 30 W, missing pulses, pulse frequency and time jitter, pulse width, and secondary pulses.

As described in detail below, the present invention teaches that customized fixtures can be utilized to allow the test station operator to test the laser transceiver unit 360 at every level of laser operation. In other words, in addition to mounting the entire laser transceiver unit 360 to the test platform 390, the test station operator can use specialized test fixtures to mount sub-assemblies to the test platform 390 so that they may be tested independently of other laser transceiver unit components. For example, the present invention provides an interferometer test fixture whereby an interferometer which has been removed from its laser transceiver unit housing can be mounted on the test platform 390 for open-case testing and alignment. Additionally, the present invention provides a cavity box test fixture whereby a cavity box which has been removed from its interferometer assembly can be mounted on the test platform 390 and tested directly.

Advantageously, in addition to providing for diagnostics with respect to beams emitted from the laser transceiver unit, the test station 210 also provides for boresight referencing and receiver testing as described below. Throughout the testing and alignment process, the test station operator utilizes a novel beamfinder assembly, also described in detail below, to quickly align the various beams to the diagnostic camera 460. A more detailed explanation of the various aspects of the exemplary test station 210 is next provided.

In exemplary embodiments, a boresight reference source (e.g., a laser diode generating a HeNe-type laser output 635 nm) is used to achieve precision laser boresight alignment. Advantageously, the HeNe-type reference beam is integrated with and afocal to the far-field collimator path, thereby providing a collimated HeNe-type output which is autocollimated from a novel reference fixture mounted on the test platform 390. To boresight a transceiver unit under test, the test station operator mounts the reference fixture on the test platform 390 in place of the unit under test. As described below, the reference fixture includes a partially reflecting reference plate and a reflecting corner cube which provide two reflections of an impinging laser beam. The test station operator then fires the boresight reference source into the beam housing 380 such that a beam emitted by the reference source exits a test beam entry port of the beam housing and reflects back from the reference fixture to provide As two reference beam spots on the diagnostic image provided by the diagnostic camera 460.

As described in more detail below, the test station operator can then adjust the position of the boresight reference source so that the two reference beam spots are aligned (e.g., on the display monitor 340). Next, the test station operator records the position of the aligned reference beam spots, removes the reference fixture from the testing platform 390, mounts the laser transceiver unit under test in its place, and fires the laser transceiver unit into the beam housing. By viewing the laser transceiver unit beam spot via the diagnostic camera 460, the test station operator can precisely boresight the laser transceiver unit by adjusting the direction of the laser transceiver unit beam (e.g., by using a pair of Risley's included in the laser transceiver unit) until the laser transceiver unit beam is positioned at the recorded reference beam spot position.

Figure 5:
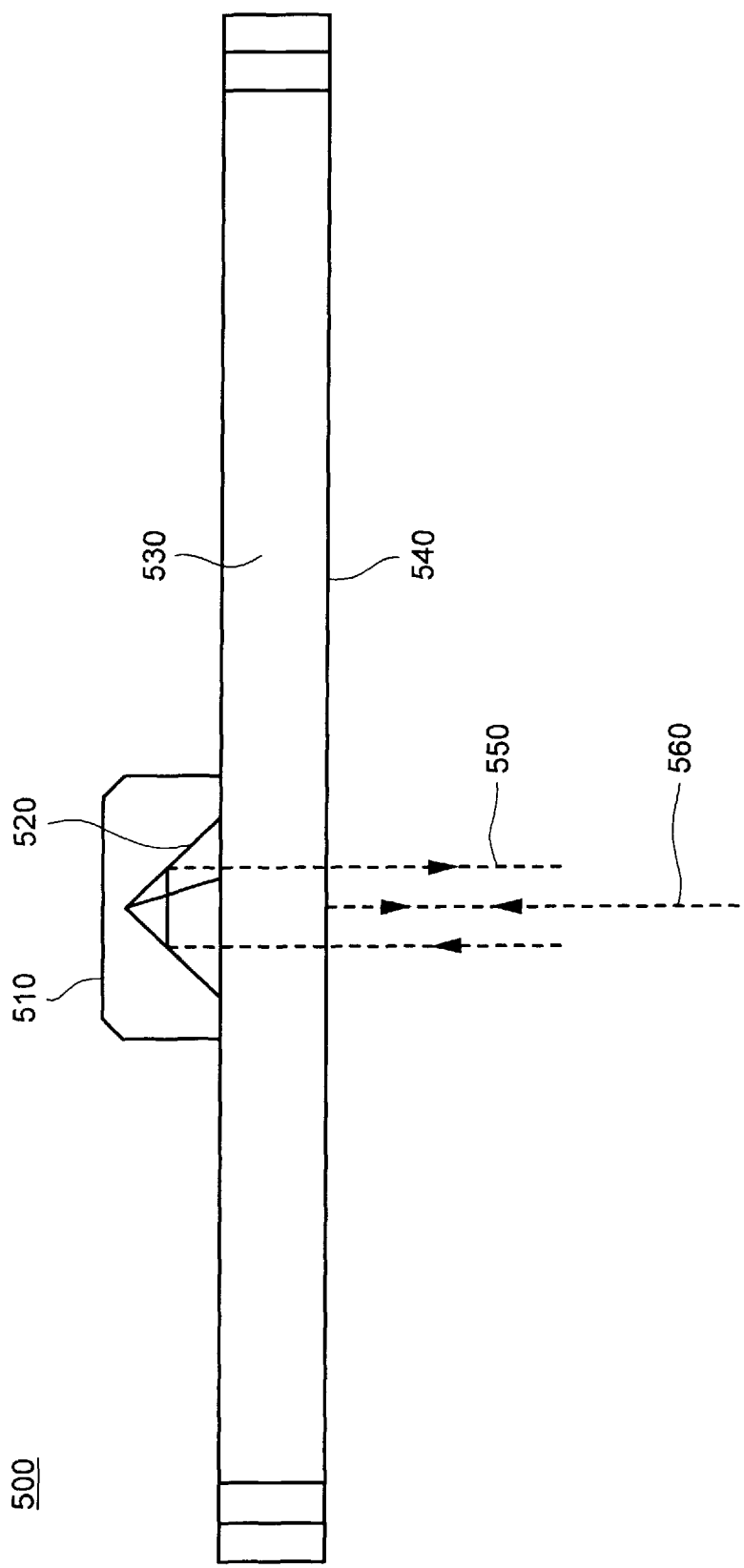
FIG. 5 depicts an exemplary reference plate, constructed in accordance with the teachings of the present invention, which may be used to obtain a boresight reference for laser transceiver alignment.

FIG. 5 depicts an exemplary reference fixture 500 constructed in accordance with the teachings of the present invention. As shown, the exemplary reference assembly 500 comprises a reference plate 530 including a front reflective surface 540, a reflective corner cube 520, and a protective housing 510. The reference fixture 500 provides two reflections 550, 560. The first 560 is from the front surface 540 of the reference plate 530, which provides the laser mounting plane reference. The second 550 is from the corner cube 520, which defines the boresight reference axis. As described above, the two reflections 550, 560 project back through the collimator within the beam housing 380 to the diagnostic camera 460. While viewing the camera's monitor 340 and controlling a motorized gimbal connected to the boresight reference source (as described below), the boresight reference axis is aligned to coincide with the laser mounting plane reflection 560, and the digital image (beam) processor 470 stores that location in memory for laser alignment referencing as described above.

Figure 6:
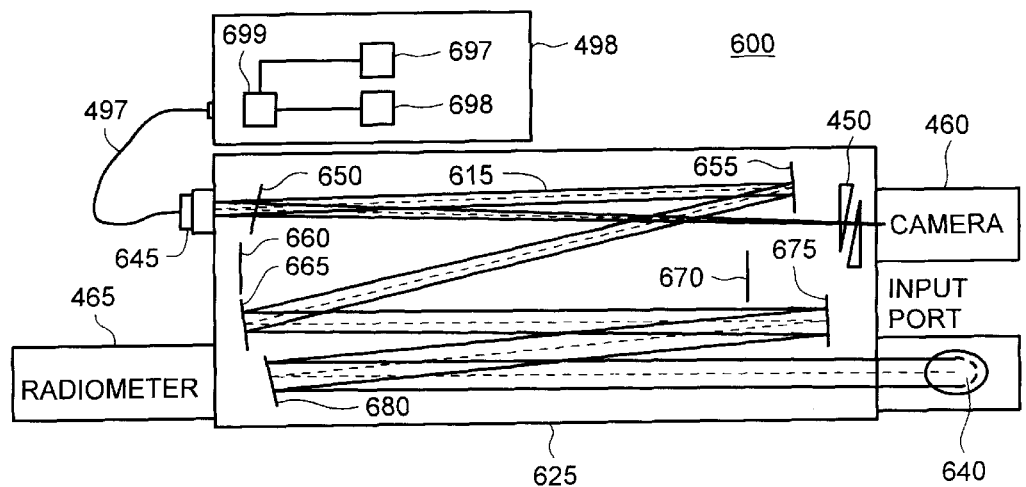
FIG. 6 is a conceptual diagram of a reference laser beam following a far-field folded collimator path within a light-tight box of an exemplary test station constructed in accordance with the teachings of the present invention.

FIG. 6 is a conceptual top view of a reference laser beam following a far-field folded collimator path within a light-tight beam box 625 which is included in the beam housing 380 of the exemplary test station 210 as described below. As shown, an exemplary reference configuration 600 comprises the laser source 498, the fiber optic cable 497, a fiber optic attenuator/collimator 645, the camera 460, the radiometer 465, a gimballed mirror 640, the light-tight beam box 625, two beam splitters 650,680 and five folding mirrors 655, 660, 665, 670, 675. The laser source 498 includes a receiver range testing source 697, a boresight reference source 698 and an optical combiner 699. The receiver range testing source 697 can be, for example, a 1.064 $\mu$m source, and the boresight reference source can be, for example, a 635 nm wavelength diode laser.

In the figure, a reference beam 615 emitted by the laser source 498 passes through the fiber optic cable 497, the fiber optic collimator 645 and the beam splitter 650. The reference beam 615 may be a boresight reference generated by the 635 nm source 698 or a receiver range testing reference generated by the 1.064 μm source 698, depending on which testing function is being performed. The test operator powers up either the 1.064 μm source 697 or the 635 nm source 698 as appropriate, and the combiner 699 couples the resulting reference beam 615 to the fiber optic cable 497.

The reference beam 615 is deflected by the folding mirrors 655, 665, 675 and beam splitter 680 to the gimballed mirror 640 where it is deflected to the reference fixture 500 mounted on the testing platform 390 (e.g., the gimballed mirror 640 deflects the beam out of the page in FIG. 6 so that it passes through an aperture in the top of the test bench 370 and toward the test platform 390). As shown, the beam(s) reflected back from the reference fixture 500 deflect off of the gimballed mirror 640, the beam splitter 680, the folding mirrors 675,665,655 and the beam splitter 650 to the diagnostic camera 460 as desired. The adjustable attenuator 450 is used to control the saturation level of the camera 460.

Figure 7:
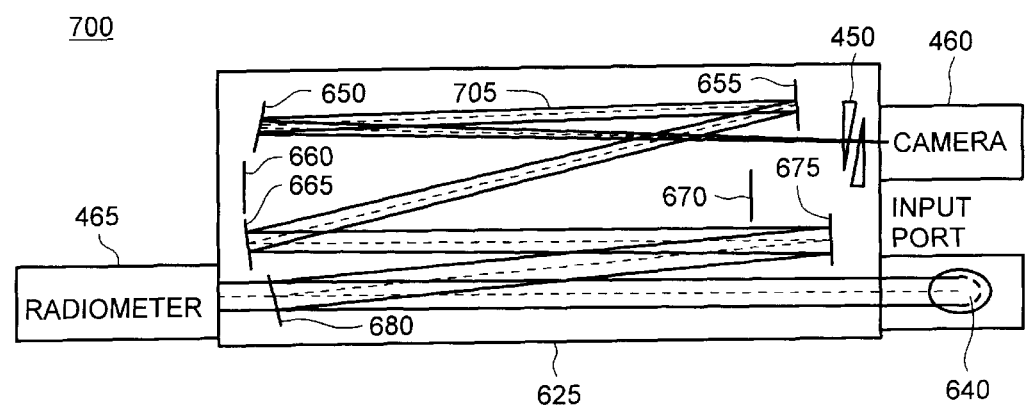
FIG. 7 is a conceptual diagram of a test laser beam following a far-field folded collimator path within a light-tight box of an exemplary test station constructed in accordance with the teachings of the present invention.

FIG. 7 is a conceptual top view of a test laser beam 705 following a far-field folded collimator path within the light-tight box 625 included in the beam housing 380 of the exemplary test station 210. As shown, an exemplary test configuration 700 comprises the camera 460, the radiometer 465, the gimballed mirror 640, the light-tight beam box 625, the two beam splitters 650,680 and the five folding mirrors 655, 660, 665, 670, 675. Such a configuration would be used, for example, during the latter stages of the boresighting procedure or during general diagnostic assessment of a laser transceiver unit and its sub-assemblies.

In the figure, a test beam 705 emitted from a laser transceiver unit or laser transceiver unit sub-assembly mounted to the test platform 390 (e.g., passing through an aperture in the top of the test bench 370) deflects off of the gimballed mirror 640, the beam splitter 680, the folding mirrors 675,665,655 and the beam splitter 650 to the diagnostic camera 460 as desired. As described above, the camera 460 provides an image to the digital beam processor 470 which in turn provides real-time beam diagnostics to the test station operator via the display monitor 340. As before, the adjustable attenuator 450 is used to control the saturation level of the camera 460. Additionally, a portion of the beam 705 passes through the beam splitter 680 and impinges on the detector head (not shown) of the radiometer 465 to provide radiometry information to the test station operator. The additional folding mirrors 660,670 are used to selectively provide a near-field collimator path as described below.

Figure 8A:
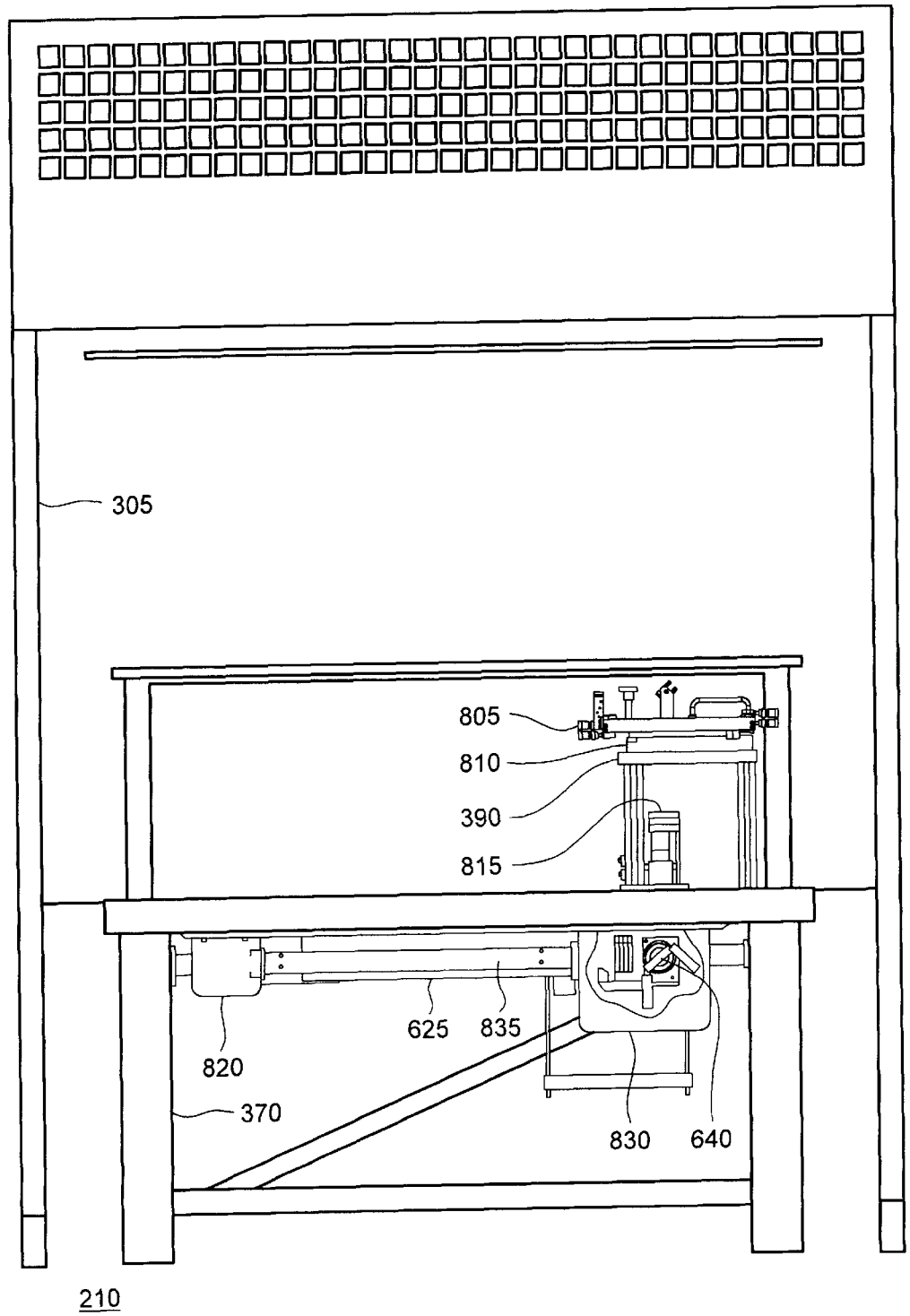
FIGS. 8(A), 8(B) and 8(C) are front, side and bottom views, respectively, of an exemplary test station constructed in accordance with the teachings of the present invention.
Figure 8B:
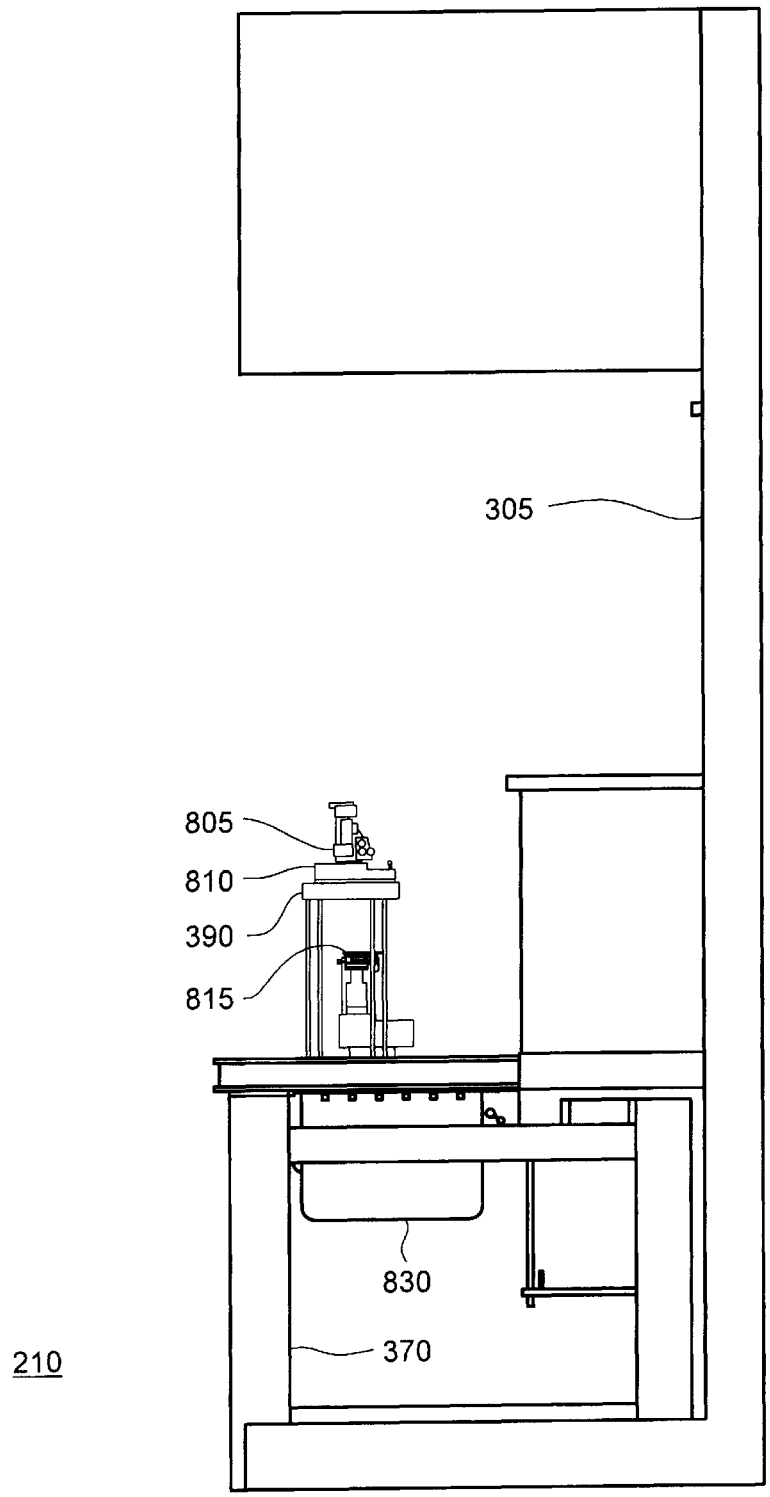
Figure 8C:
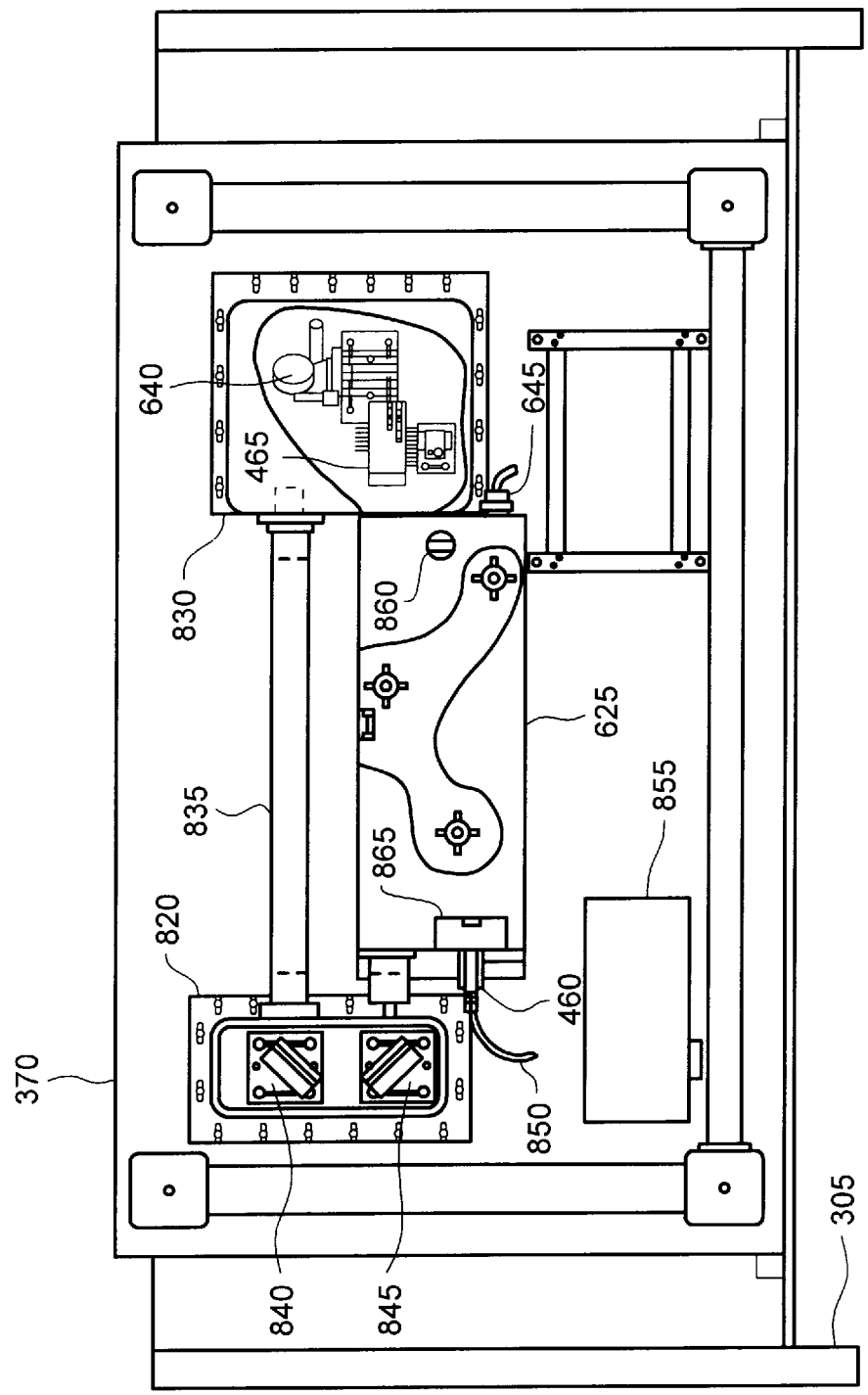

FIGS. 8(A), 8(B) and 8(C) show front, side and bottom views, respectively, of the exemplary test station 210. As shown, the exemplary test station 210 comprises the hood 305, the test bench 370, a cavity box test fixture 805, an interferometer test fixture 810, the test platform 390, a beamfinder assembly 815 (housing the beam findercamera 499) and the gimballed mirror 640. The test station 210 also comprises a first sub-housing 820, a second sub-housing 830, a light tube 835 and the beam box 625, which collectively form the light-tight beam housing 380. As shown in FIG. 8(C), the test station 210 also includes first and second corner reflectors 840, 845, the camera 460, a camera cable 850, the variable attenuator 450, a field selector 860, the fiber optic attenuator 645, and the radiometer 465.

During testing and alignment, the test station operator mounts a laser transceiver unit under test, or the reference fixture 500, directly to the test platform 390. Alternatively, the test station operator can use the interferometer test fixture 810 to mount an interferometer standing alone. Additionally, the cavity box test fixture 805 can be used in combination with the interferometer test fixture 810 to mount a cavity box standing alone, for example for cavity box efficiency testing. The test laser transceiver unit, the test interferometer, or the test cavity box is then fired through an aperture in the test platform 390, through an aperture in the bench top and into the beam housing 380. Within the beam housing 380, the test beam is deflected from the gimballed mirror 640, through the light tube 835, off the mirrors 840,845 and into the beam box 625. Within the beam box 625, the test beam is directed to the various diagnostic components as described above. In exemplary embodiments, the beam box 625 is constructed as described above with reference to FIG. 6. Such a beam box is available from Coherent, Inc. of Santa Clara, Calif.

As described in more detail below, the beamfinder assembly 815 of FIGS. 8(A) and 8(B) is used to align the test beam to the diagnostic camera 460. In other words, because the field of view of the diagnostic camera 460 is narrow (tailored to provide diagnostics for a pin-point beam), the relatively wide field-of-view beamfinder assembly 815 is used so that the test station operator can quickly position the beam within the viewing range of the diagnostic camera 460. When a device under test is first fired into the beam housing 380, the beamfinder assembly 815 is positioned between the device under test and the top of the test bench 370. The test station operator then views an image of the test beam which is provided by the wide-field beamfinder camera 499 within the beamfinder assembly (e.g., via the display monitor 340). Next, the operator makes coarse adjustments (e.g., using the mirrors or the Risleys provided on the device under test) to bring the test beam within the field of view of the diagnostic camera 460 (e.g., by matching the beam spot provided by the beamfinder camera 499 to a cross-hair provided on the display monitor 340). Finally, the operator removes the beamfinder assembly 815 and proceeds with laser testing and alignment using the primary diagnostic camera 460.

Figure 9A:
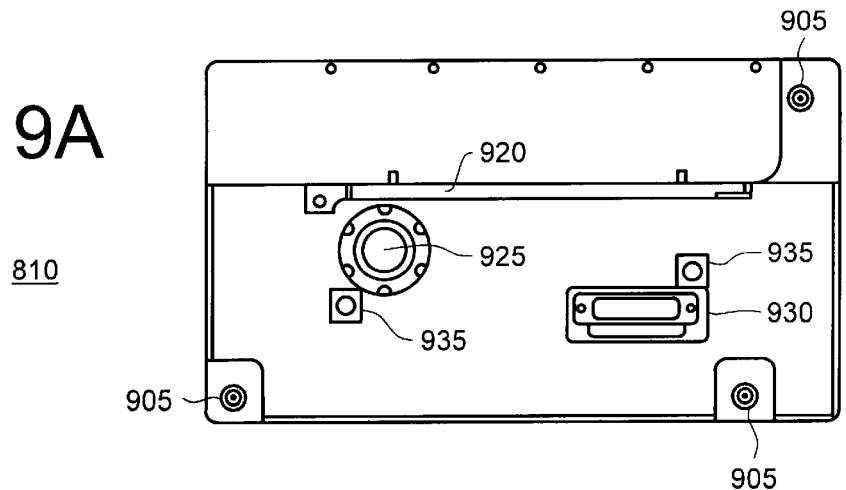
FIGS. 9(A), 9(B) and 9(C) are top, side and front views, respectively, of an exemplary interferometer test fixture constructed in accordance with the teachings of the present invention.
Figure 9B:
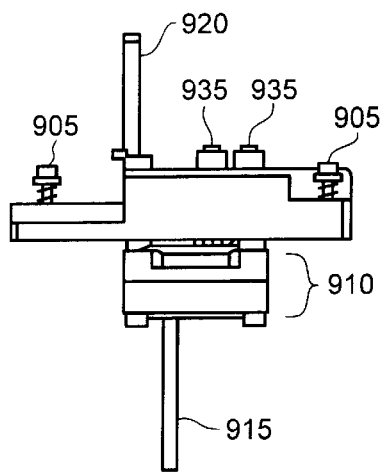
Figure 9C:
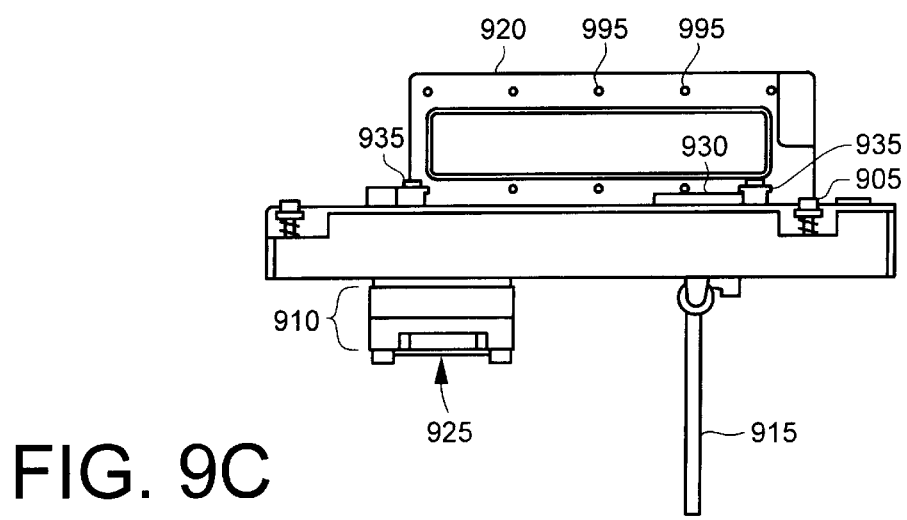

FIGS. 9(A), 9(B) and 9(C) show top, side and front views, respectively, of the exemplary interferometer test fixture 810. As shown, the exemplary interferometer test fixture 810 comprises a cavity box mounting plate 920 (including screw holes 995), mounting bolts 905, interferometer mounting points 935, an electrical connector 930, an electrical cable 915, a pair of rotatable wedged lenses or Risleys 910, and a beam aperture 925. During testing and alignment, an interferometer under test is mounted to the mounting plate 920 via the screw holes 995. The test fixture 810 is then mounted to the testing platform 390 via the mounting bolts 905. The electrical cable 915 and the connector 930 are used to provide power supply and control signals to the interferometer under test. During testing, the interferometer fires through the beam aperture 925 which corresponds to a beam aperture in the mounting platform 390. The Risleys 910 simulate those found within the laser transceiver unit from which the interferometer was removed and are used to adjust the direction of the beam.

Figure 10A:
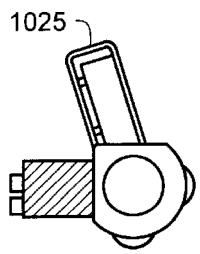
FIGS. 10(A), 10(B), 10(C) and 10(D) are side cross-section, front, bottom and perspective views, respectively, of an exemplary cavity-box test fixture constructed in accordance with the teachings of the present invention.
Figure 10B:
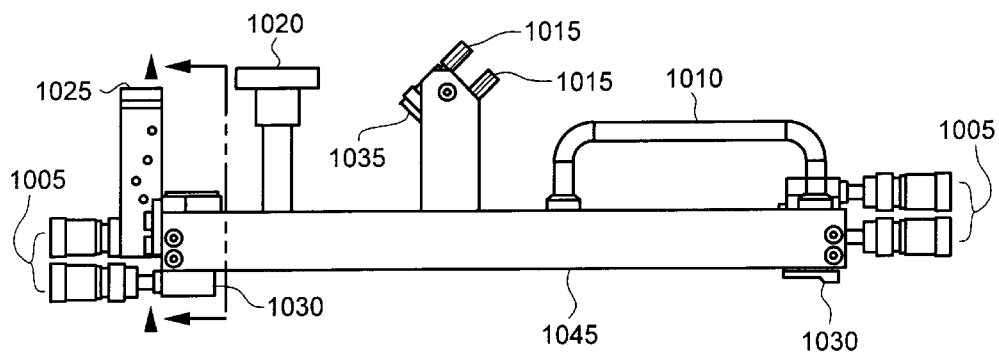
Figure 10C:
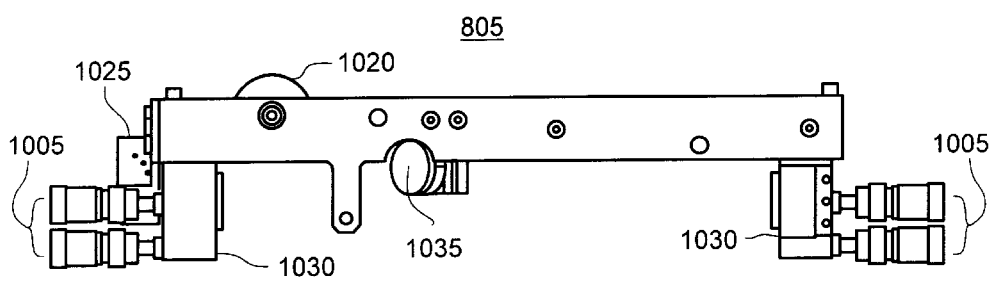
Figure 10D:
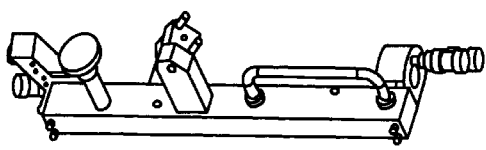

FIG. 10(A) is a cross-sectional side view of the exemplary cavity-box test fixture 805. Additionally, FIGS. 10(B), 10(C) and 10(D) show front, bottom and perspective views, respectively, of the exemplary cavity-box test fixture 805 shown in FIG. 10(A). The exemplary cavity box test fixture 805 includes two terminating mirror housings 1030, four terminating mirror control knobs 1005, a body 1045, a vertical mirror housing 1025, a first handle 1020, a second handle 1010, a directional mirror 1035, and two directional mirror control knobs 1015.

During testing and alignment, a laser cavity box is mounted to the body 1045 of the cavity box test fixture 805, the cavity box test fixture 805 is mounted to the interferometer test fixture 810, and the interferometer test fixture 810 is mounted to the test platform 390. The cavity box is then fired, and a reflecting mirror within the vertical mirror housing 1025 directs the emitted test beam up and back to the directional mirror 1035. The directional mirror 1035 then directs the beam through the test aperture 925 of the interferometer test fixture 810 and toward the beam housing 380 for diagnostic measurement. Terminating mirrors within the terminating mirror housings 1030 are used to simulate those of the interferometer from which the cavity box under test was removed. The terminating mirror control knobs 1005 and the directional mirror control knobs 1015 are used to adjust the terminating mirrors and the directional mirror 1035, respectively.

Figure 11C:
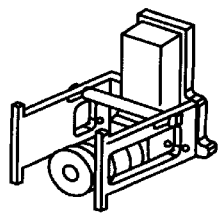
FIGS. 11(A), 11(B) and 11(C) are front, side and perspective views, respectively, of an exemplary beamfinder assembly constructed in accordance with the teachings of the present invention.
Figure 11B:
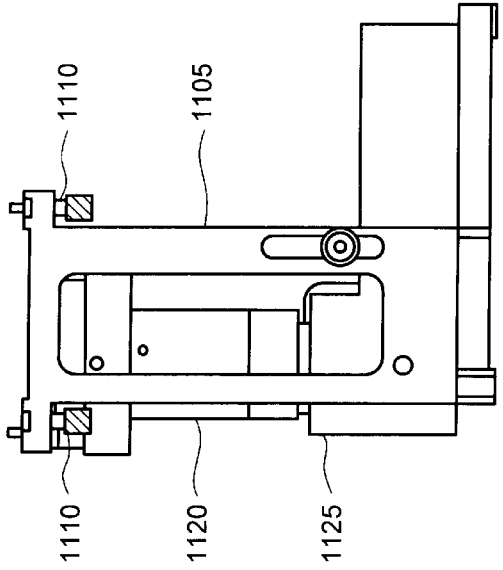
Figure 11A:
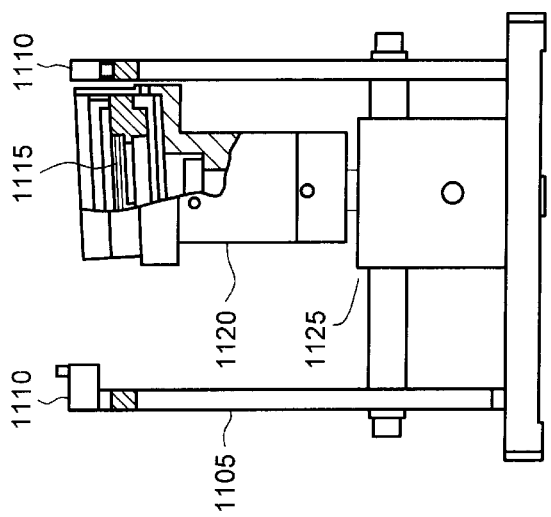

FIGS. 11B) and 11(C) show front, side and perspective views, respectively, of the exemplary beamfinder assembly 815. As shown, the exemplary beamfinder assembly 815 comprises a base 1105, mounting screws 1110, a quad-step adjustable attenuator 1115, a filter housing 1120, and a camera housing 1125. During testing and alignment, the beamfinder assembly 815 is positioned beneath the testing platform 390 to provide for quick coarse adjustments as described above. The adjustable attenuator 1115 is used to set saturation levels for the wide-field beamfinder camera 499 which is contained within the camera housing 1125. In exemplary embodiments, the adjustable attenuator 1115 is a step-filter providing four levels of attenuation. Such a step-filter can be constructed as described in detail below. The beamfinder camera 499 of the beamfinder assembly 815 is coupled to the display monitor 340 in a fashion which is well known in the art.

In exemplary embodiments of the test station 210, a receiver testing source (e.g., the 1.06 $\mu$m NdYAG laser source 697) generating an output simulating that of a laser transceiver unit under test is used to fire a beam through the test station beam housing and into a receiver assembly associated with the laser transceiver unit under test. The receiver test equipment includes the receiver testing source 697, the laser attenuator 645, an EMI screen box (not shown), and a receiver interface adapter (not shown). The laser receiver is mounted in an EMI resistant metal box to reduce the possibility of false alarms due to other electronic equipment. Access holes in the box allow probing of test points and setting of trim pots for sensitivity adjustments. The receiver is mounted on the testing platform 390 via the interface adapter, which provides all electrical connections necessary for power and I/O signals. An optical port on the EMI box allows laser stimulus to enter the receiver's optic aperture. The optical port is held by machine tolerances to provide a boresighted input.

A noted above, the optical signal for receiver (or boresight) sensitivity testing and adjustment can be provided by a fiber optic coupled laser diode source operating at the 1.06 $\mu$M wavelength. Such devices are commercially available and are controllable via an IEEE-488 bus. The precise output of the optical signal is determined by attenuating the pulse generated by the optical source with the fiber optic attenuator 645. The fiber optic attenuator 645 can control the signal over 50 dB with a resolution of 1%. The output of the fiber optic attenuator 645 is sent via the fiber optic cable 497 to a collimating lens that underfills the receiver's optical aperture. The underfilling of the aperture insures that all the energy from the fiber optic attenuator 645 is sent through the receiver's field stop eliminating radiometric errors due to aperture tolerances and speckle effects. In alternative embodiments, a coiled fiber optic bundle can be attached to the beam box in place of the fiber optic attenuator for range testing.

As noted above, the beamfinder assembly 815 may use a multiple-step attenuator to set saturation levels for the beamfinder camera 499. While adjustable filters are available commercially, they tend to be somewhat bury and relatively expensive. Advantageously, the present invention teaches that a useful step-wise adjustable attenuator can be constructed inexpensively using commonly available circular wedged filters. In exemplary embodiments, the wedged filters are inexpensive 1" diameter circular filters having an unknown degree of wedge. As is well known in the art, the wedge tends to deflect a beam passing through the filter and is not a desirable filter feature in the context of the present invention. Advantageously, the present invention teaches that a step-filter having substantially no wedge effect can be constructed using the inexpensive and imprecise circular filters.

Figure 12:
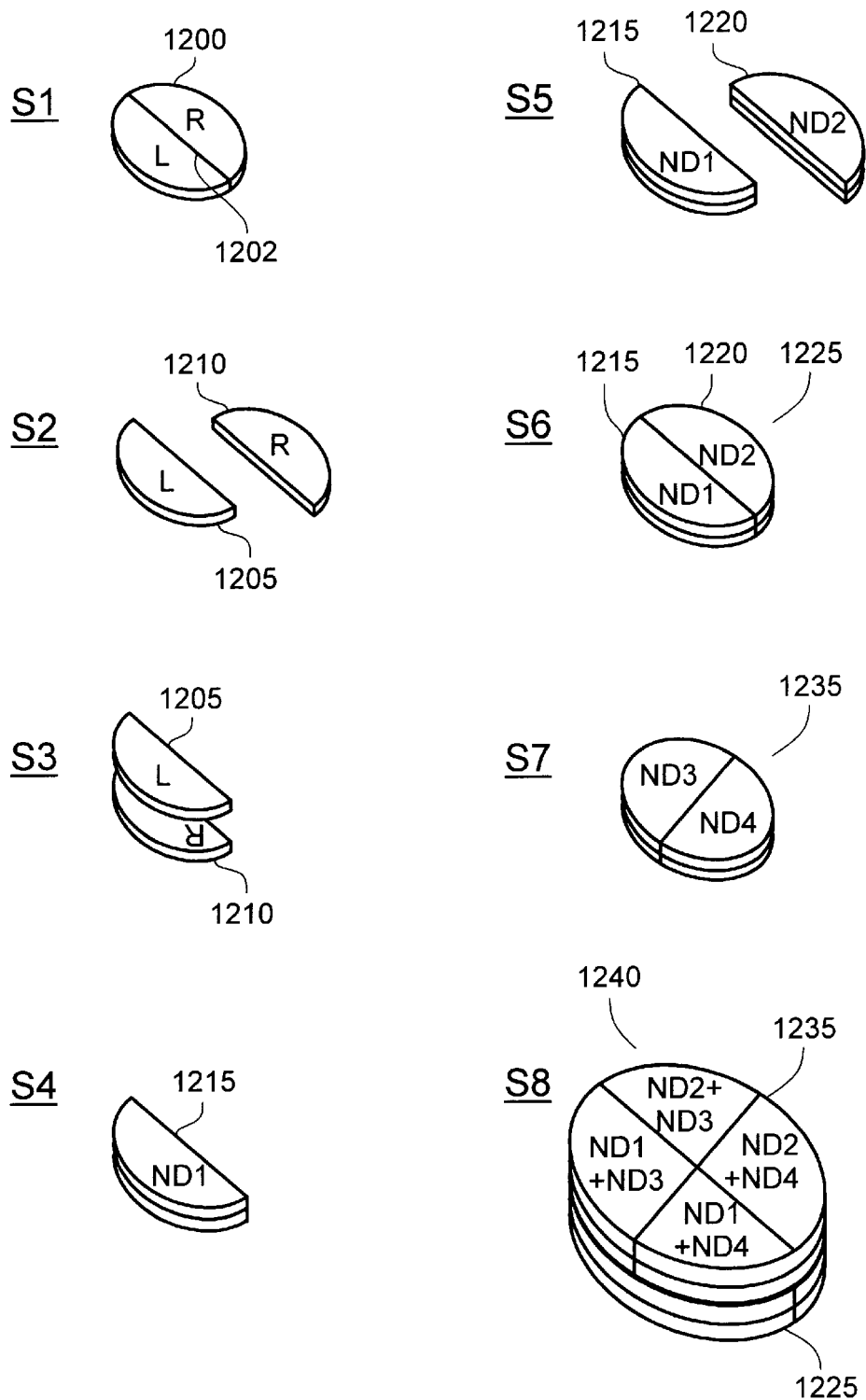
FIG. 12 is a diagram of an exemplary method for constructing a step-wise adjustable beam attenuator as taught by the present invention.

FIG. 12 depicts an exemplary method for constructing a variable beam attenuator according to the present invention. As shown, the exemplary method comprises eight steps S1–S8. In step S1, a first circular wedged filter 1200 is marked with a bisecting line 1202. In step S2, the wedged filter 1200 is cut along the bisecting line 1202 to create a left portion 1205 and a right portion 1210. In step S3, the right portion 1210 is rotated 180° in a plane defined by an upper surface of the right portion 1210 and positioned beneath the left portion 1205. In step S4, the left portion 1205 and the right portion 1210 are bonded to form a first half-filter 1215 providing a first level of optical attenuation. Because the wedge effects caused by the left and right portions will largely cancel each other, the first half-filter 1215 will include substantially no wedge effect.

In step S5, steps SI through S4 are repeated using a second wedged filter to create a second half-filter 1220 providing a second level of optical attenuation and including substantially no wedge effect. In step S6, the first half-filter 1215 and the second half-filter 1220 are bonded edge-wise to form a first two-step optical attenuator 1225. In step S7, steps Si through S6 are repeated using third and fourth wedged filters to form a second two-step filter 1235. In step S8, first two-step filter 1225 and second two-step filter 1235 are bonded to form a quad step-filter 1240. Thus, the present invention teaches that a four-step variable attenuator can be constructed inexpensively using four circular wedge filters. As described below with reference to FIGS. 13 and 14, the eight pieces (i.e., the two halves of each of the four circular filters) can be configured in an alternative fashion to provide a four-step filter having very low wedge.

Figure 13:
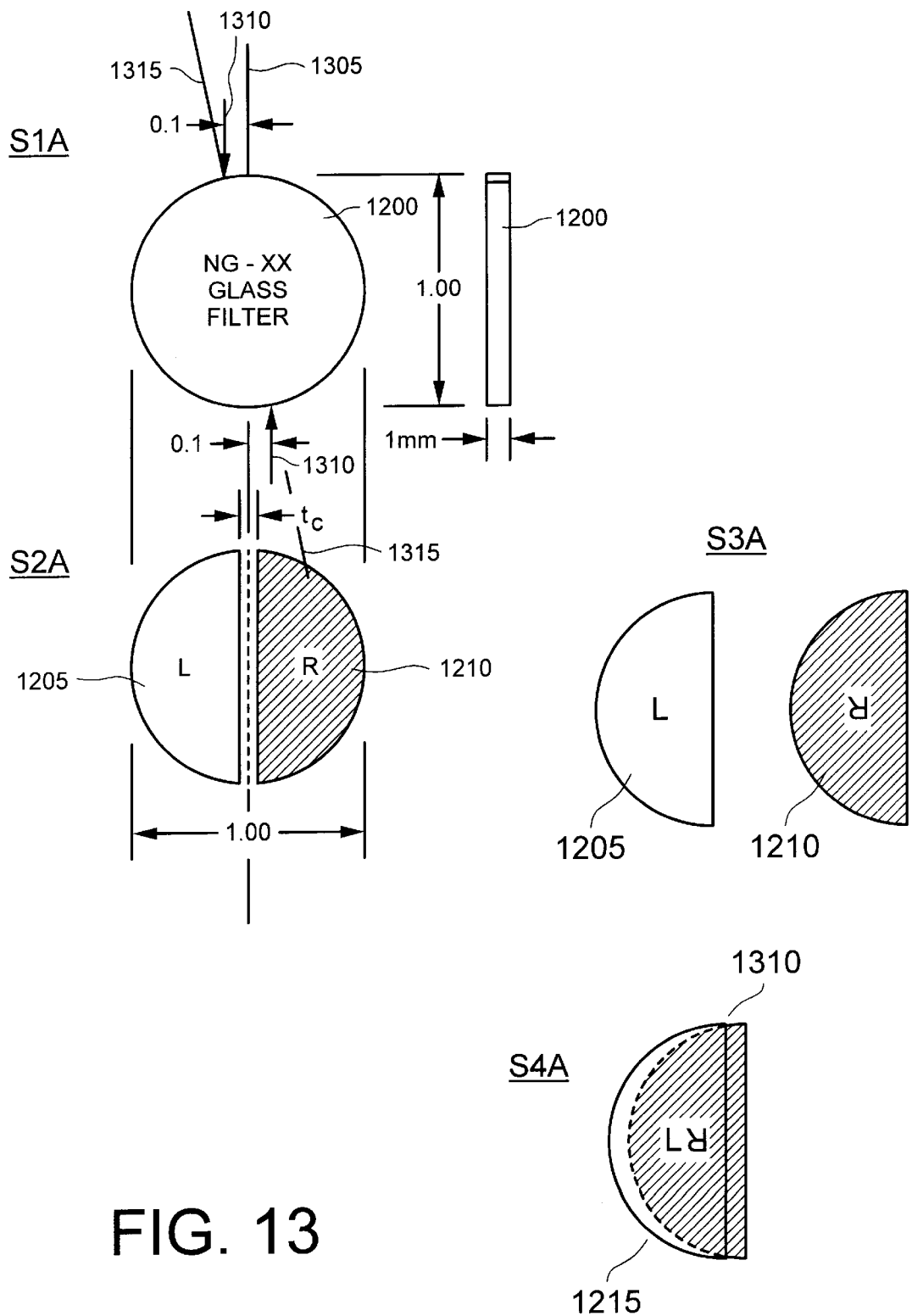
FIG. 13 is a diagram of a second exemplary method for constructing a step-wise adjustable beam attenuator as taught by the present invention.
Figure 14A:
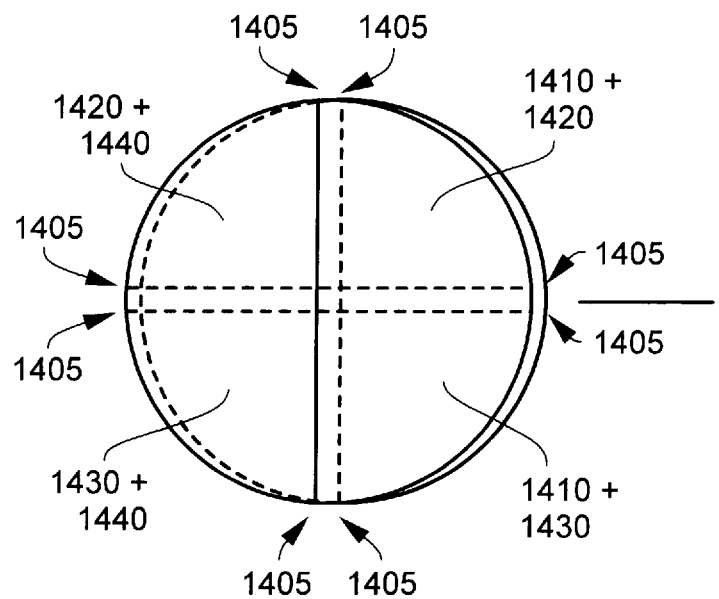
FIGS. 14(A), 14(B), 14(C) and 14(D) are left-side, front, right-side and bottom views, respectively, of an exemplary four-step variable beam attenuator constructed in accordance with the teachings of the present invention.
Figure 14B:
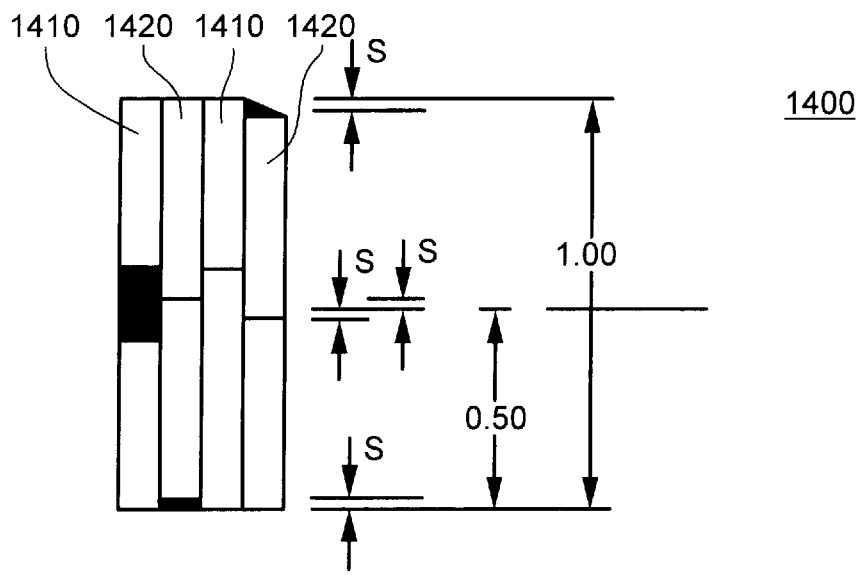
Figure 14C:
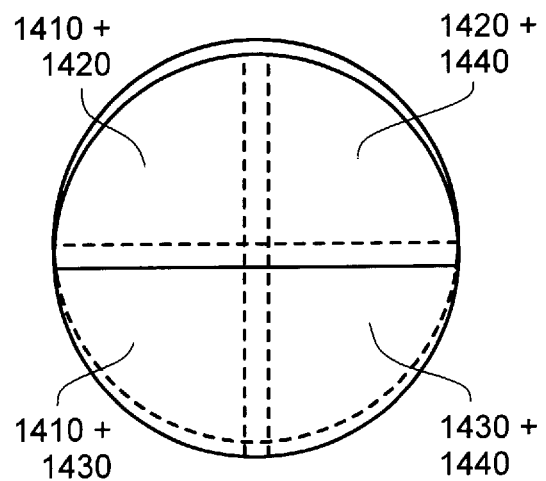
Figure 14D:
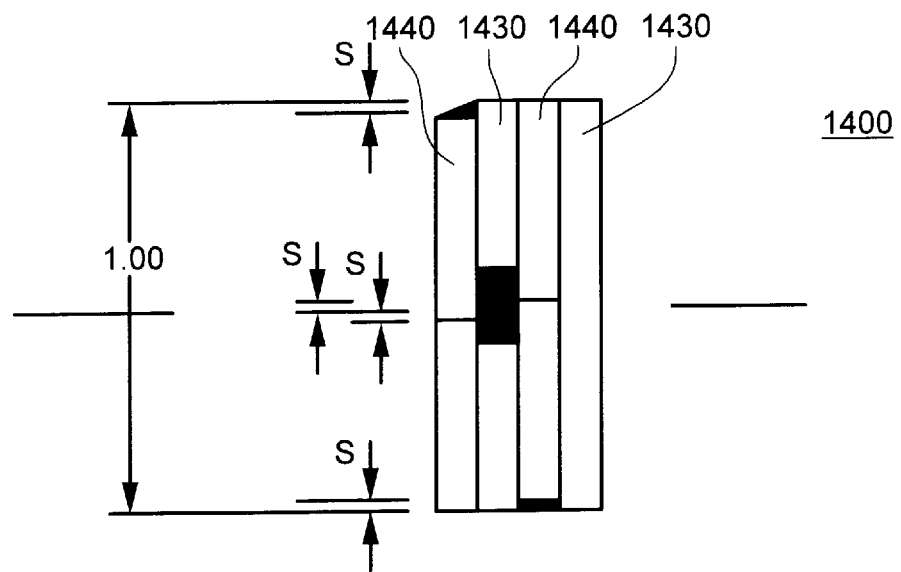

FIG. 13 depicts an exemplary method for constructing a half-filter such as that described above with reference to FIG. 12. As shown, in step S1A two marks 1310 are scribed on the edge of the circular filter 1200 at opposite ends of an imaginary arbitrary center line 1315 crossing the face of the filter 1200. At step S2A, the circular filter 1200 is cut along a bisecting centerline which is offset from the edge marks by 0.1 inches to form the left piece 1205 and the right piece 1210. At step S3A, the right piece 1210 is rotated 180 degrees in the plane of FIG. 13. Finally, at step S4A, the right piece 1210 is positioned beneath the left piece 1205 so that the scribe marks 1310 are aligned. Because some material is removed during the cutting process, the two pieces will be slightly offset from one another as shown.

Rather than bonding the faces of the left and right pieces directly to one another as described above with respect to FIG. 12, the two pieces can be configured with six corresponding pieces cut from three additional circular wedge filters to provide a superior quad step-filter.

FIGS. 14(A), 14(B), 14(C) and 14(D) show left side, front, right side and bottom views, respectively, of such an exemplary four-step filter. As shown, the quad-step filter comprises four pairs 1410, 1420, 1430, 1440 of semicircular filter pieces, each pair processed in accordance with the method of FIG. 13. In FIG. 14, the eight pieces are matched in corresponding pairs and interleaved to form a four-layer quad filter having four sections each providing a distinct level of optic attenuation with substantially no wedge effect. As shown, the pieces in each layer are alternately offset from a centerpoint of the quad filter, and adhesive is applied at the resulting recesses 1405 so that the quad filter is substantially cylindrical and mechanically sturdy.

Figure 15:
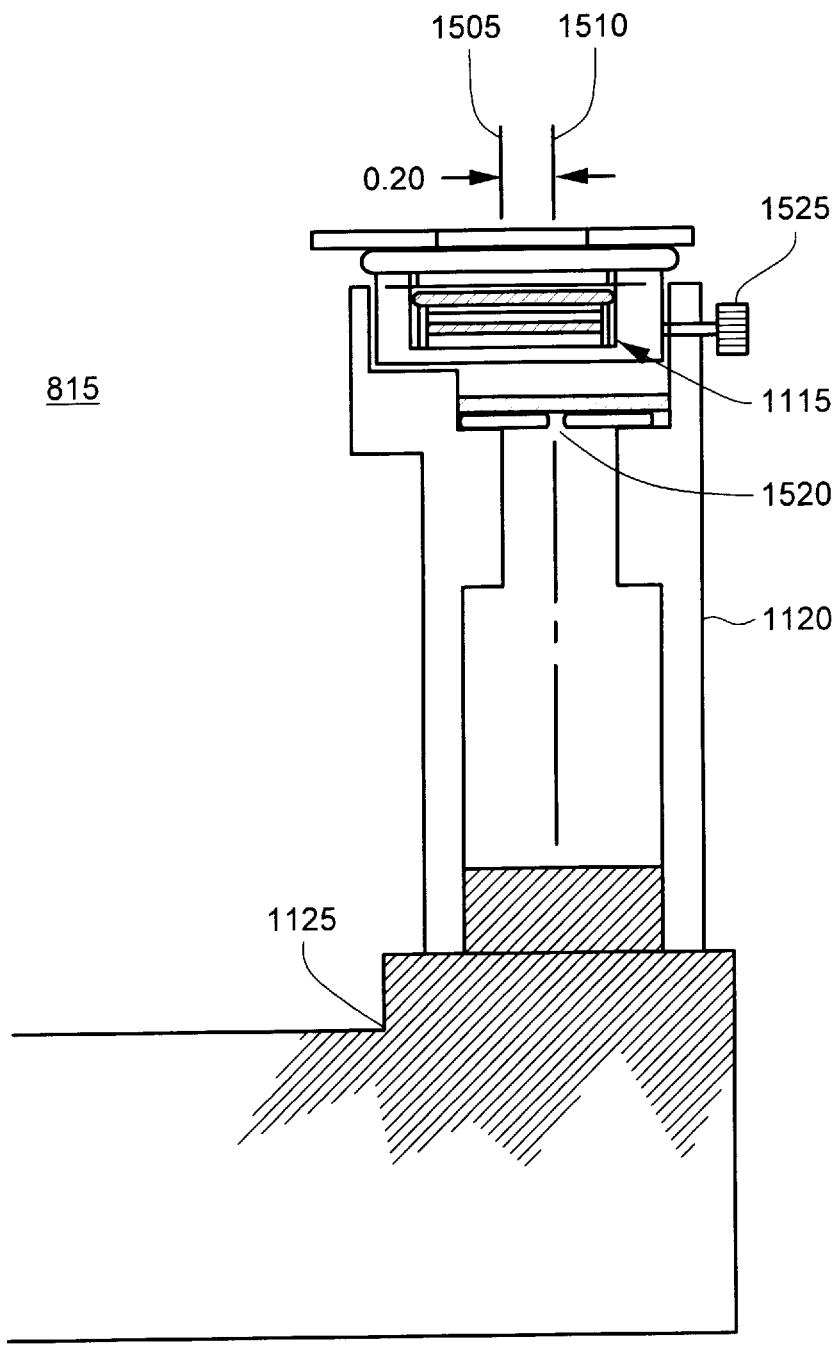
FIG. 15 depicts an exemplary beamfinder assembly constructed in accordance with the teachings of the present invention.

FIG. 15 depicts the exemplary beamfinder assembly 815 employing a step-filter such as that shown in FIG. 14. As shown, the beamfinder assembly 815 comprises the quad step-filter 1115, a pin hole aperture 1520, the camera housing 1125 and an adjustment knob 1525. A center axis 1505 of the quad filter 1115 is positioned such that a center portion of one quadrant of the step-filter 1115 is aligned with a line of sight 1510 defined by the pin-hole aperture 1520 and a camera within the camera housing 1125. During testing and alignment, the test station operator positions the beamfinder assembly underneath the testing platform 390 as described above. The operator then selects a desired level of filter attenuation (i.e., a desired camera saturation level) by rotating the step-filter 1115 until an appropriate section of the filter 1115 is aligned with the camera. The operator then tightens the adjustment knob 1525 to secure the filter 1115 in place.

As the foregoing discussion makes clear, the present invention teaches methods and apparatus which significantly improve the art of laser repair and maintenance. By placing extensive dynamic testing and alignment resources within arm's reach of a single operator, the present invention enables a technician having relatively little specialized training to obtain a high level of system repair through-put at significantly reduced cost. Empirical studies have proven that the synergies created by embodiments of the present invention yield laser repair success rates, in terms of both speed and accuracy, heretofore unheard of in the art of laser repair and maintenance.

Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

I claim:

1. A laser alignment and test station, comprising:
    a test bench;
    a mounting platform attached to said test bench for mounting a laser unit under test;
    a beam housing attached to said test bench and including at least one collimator path for receiving a laser beam emitted by the unit under test;
    a diagnostic camera attached to said beam housing and optically aligned with said collimator path for providing a diagnostic image of the laser beam emitted by the unit under test; and
    a beamfinder assembly selectively positionable between said mounting platform and said beam housing for providing a wide-field image of the laser beam emitted by the unit under test and for thereby allowing a user of said station to align the emitted laser beam to a field of view of said diagnostic camera.

2. The alignment and test station of claim 1, further comprising a display monitor allowing the user of said station to view the diagnostic image provided by said diagnostic camera and said beamfinder assembly in real time.

3. The alignment and test station of claim 1, further comprising a digital image processor for processing the diagnostic image provided by said diagnostic camera and for providing real-time diagnostic beam information to the user of said station.

4. The alignment and test station of claim 1, further comprising a radiometer attached to said beam housing and optically aligned with said collimator path for providing radiometry information relating to the laser beam emitted by the unit under test.

5. The alignment and test station of claim 4, further comprising a radiometer display device coupled to said radiometer for allowing the radiometry information to be viewed in real time.

6. The alignment and test station of claim 1, further comprising a pulse detector attached to said beam housing and optically aligned with said collimator path for providing pulse information relating to the laser beam emitted by the unit under test.

7. The alignment and test station of claim 6, further comprising a pulse display device coupled to said pulse detector for allowing the pulse information to be viewed in real time.

8. The alignment and test station of claim 1, further comprising a beam attenuator attached to said beam housing and optically aligned with the collimator path to control a saturation level of said diagnostic camera.

9. The alignment and test station of claim 8, wherein said beam attenuator is controllably variable, and wherein said station includes an attenuator controller for adjusting a level of attenuation of said beam attenuator to adjust the saturation level of said diagnostic camera.

10. The alignment and test station of claim 8, further comprising a laser electronics unit for providing power and control signals to the laser unit under test.

11. The alignment and test station of claim 1, further comprising:
    a display monitor coupled to said diagnostic camera for displaying images provided by said diagnostic camera and said beamfinder assembly in real time;
    a digital image processor coupled to said diagnostic camera for processing the diagnostic image provided by said diagnostic camera and for providing real-time diagnostic beam information;
    a radiometer attached to said beam housing and optically aligned with said collimator path for providing radiometry information relating to the laser beam emitted by the unit under test;
    a controllably variable beam attenuator attached to said beam housing and optically aligned with the collimator path to control a saturation level of said diagnostic camera;
    an attenuator controller coupled to said beam attenuator for adjusting a level of attenuation of said beam attenuator to adjust the saturation level of said diagnostic camera;

a laser electronics unit for providing power and control signals to the laser unit under test; and a computer interface coupled to, and controlling operation of, said display monitor, said digital image processor, said radiometer, said attenuator controller and said laser electronics unit.

12. The alignment and test station of claim 11, wherein said computer interface, said display monitor, said digital image processor, said radiometer, said attenuator controller and said laser electronics unit are coupled via an IEEE 488 bus.

13. The alignment and test station of claim 1, wherein said mounting platform is configured and dimensioned to enable a fully assembled laser transceiver unit to be mounted as the laser unit under test.

14. The alignment and test station of claim 1, further comprising an interferometer test fixture configured and dimensioned to enable a laser interferometer to be mounted to said mounting platform as the laser unit under test.

15. The alignment and test station of claim 14, wherein said interferometer test fixture includes an electrical connector for providing power and control signals to a cavity box within an interferometer mounted using said interferometer test fixture.

16. The alignment and test station of claim 14, wherein said interferometer test fixture includes a pair of adjustable wedged lenses for controlling a direction of a laser beam emitted by an interferometer mounted using said interferometer test fixture.

17. The alignment and test station of claim 1, further comprising a cavity box test fixture configured and dimensioned to enable a laser cavity box to be mounted to said mounting platform as the laser unit under test.

18. The alignment and test station of claim 17, wherein said cavity box test fixture includes reflecting mirrors for directing a laser beam emitted by a cavity box mounted using said cavity box test fixture toward an entry port of said beam housing.

19. The alignment and test station of claim 17, wherein said cavity box test fixture includes a pair of terminating mirrors simulating an optical path of an interferometer in which the laser cavity box is used in practice, and wherein said cavity box test fixture also includes control knobs for adjusting said terminating mirrors.

20. The alignment and test station of claim 19, wherein said beam housing includes a far-field folded collimator path and a near-field folded collimator path providing far-field and near-field diagnostics, respectively.

21. The alignment and test station of claim 20, wherein said beam housing includes a switch for switching between said far-field and said near-field folded collimator paths.

22. The alignment and test station of claim 1, further comprising a boresight reference source coupled to said beam housing and optically aligned with the collimator path for providing a boresight reference beam which is used to obtain a boresight reference position for the laser unit under test.

23. The alignment and test station of claim 22, further comprising a fiber optic collimator attached to said beam housing and optically aligned with the collimator path for auto-collimating the boresight reference beam emitted by said laser boresight reference source.

24. The alignment and test station of claim 22, wherein said boresight reference source is a laser diode emitting a HeNe-type laser beam.

25. The alignment and test station of claim 22, further comprising a reference fixture which can be mounted to said mounting platform to reflect the boresight reference beam emitted by said boresight reference source and to thereby provide a reference beam spot at said diagnostic camera.

26. The alignment and test station of claim 25, wherein said reference fixture comprises a partially reflecting reference plate and a reflecting corner cube.

27. The alignment and test station of claim 1, further comprising a receiver testing source coupled to said beam housing and optically aligned with the folded collimator path for providing a transmit beam which simulates a laser beam emitted by a laser unit under test and for thereby enabling a receiver assembly of the unit under test to be analyzed.

28. The alignment and test station of claim 27, wherein said receiver testing source is an NdYag laser.

29. The alignment and test station of claim 1, further comprising a coiled fiber optic cable coupled to said beam housing and optically aligned with the folded collimator path for providing receiver range testing of the unit under test.

30. The alignment and test station of claim 1, wherein said beamfinder assembly comprises an adjustable step-filter, a pin-hole lens and a wide-field camera.

31. The alignment and test station of claim 1, further comprising a gimballed reflecting mirror attached to said test bench for directing the laser beam emitted by the unit under test toward an entry port of said beam housing.

32. The alignment and test station of claim 1, further comprising a protective hood providing cover and lighting for said test bench.

33. A method for aligning and testing a laser device, comprising the steps of:

mounting a laser device under test to a mounting platform;

firing the laser device into a beam housing having a collimator path and a diagnostic camera which is optically aligned with the collimator path;

positioning a wide-field camera between the laser device and the diagnostic camera;

viewing a wide-field image, provided by the wide-field camera, of the beam emitted by the laser device;

adjusting a direction of the beam emitted by the laser device, based on said step of viewing the wide-field image, such that the beam emitted by the laser device impinges upon a field of view of the diagnostic camera;

removing the wide-field camera from between the laser device and the diagnostic camera;

viewing a diagnostic image, provided by the diagnostic camera, of the beam emitted by the laser device; and aligning and repairing the laser device as necessary based on said step of viewing the diagnostic image.

34. The method of claim 33, wherein said step of mounting a laser device to a mounting platform comprises the steps of:

mounting a laser interferometer to an interferometer test fixture; and mounting the interferometer test fixture to the mounting platform.

35. The method of claim 34, wherein said step of adjusting the direction of the beam comprises the step of adjusting a pair of a wedged lenses attached to the interferometer test fixture.

36. The method of claim 33, wherein said step of mounting a laser device to a mounting platform comprises the steps of:

mounting a laser cavity box to a cavity box test fixture;

mounting the cavity box test fixture to an interferometer test fixture; and mounting the interferometer test fixture to the mounting platform.

37. The method of claim 36, wherein said step of adjusting the direction of the beam comprises the step of adjusting a pair of terminating mirrors attached to the cavity box test fixture.

38. The method of claim 36, wherein said step of adjusting the direction of the beam comprises the step of adjusting a reflecting mirror attached to the cavity box test fixture.

39. The method of claim 33, comprising the additional step of viewing radiometry information which relates to the beam emitted by the laser device and which is provided by a radiometer attached to the beam housing and optically aligned with the collimator path, wherein said step of aligning and repairing the laser device as necessary is based on said step of viewing the diagnostic image and on said step of viewing the radiometry information.

40. The method of claim 33, comprising the additional step of viewing beam pulse information which relates to the beam emitted by the laser device and which is provided by a pulse detector attached to the beam housing and optically aligned with the collimator path, wherein said step of aligning and repairing the laser device as necessary is based on said step of viewing the diagnostic image and on said step of viewing the beam pulse information.

41. The method of claim 33, comprising the additional steps of:

mounting a reference fixture to the mounting plate in place of a laser device under test, wherein said reference fixture includes a partially reflecting reference plate and a reflecting corner cube;

firing a boresight reference source, which is coupled to the beam housing and optically aligned with the collimating path, into the beam housing such that a beam emitted by the boresight reference source exits a test beam entry port of the beam housing and reflects back from the reference fixture to provide two reference beam spots on the diagnostic image provided by the diagnostic camera;

adjusting a position of the boresight reference source so that the two reference beam spots are aligned;

recording a position of the aligned reference beam spots;

removing the reference fixture from the mounting platform;

mounting a laser device under test to the mounting platform;

firing the laser device into the beam housing;

viewing a position of the beam emitted by the laser device on the diagnostic image provided by the diagnostic camera; and adjusting a direction of the beam emitted by the laser device so that the position of the beam emitted by the laser device matches the recorded position of the two reference beam spots.

42. The method of claim 33, comprising the additional steps of:

firing a laser transmit source, which is coupled to the beam housing and optically aligned with the collimating path, into the beam housing such that a transmit beam emitted by the transmit source exits a test beam entry port of the beam housing and impinges upon a receiver assembly of the laser device under test;

analyzing performance of the receiver assembly; and aligning and repairing the receiver assembly as necessary based on said step of analyzing.

43. The method of claim 33, wherein the diagnostic and wide-field images are viewed on at least one display monitor.

44. The method of claim 33, comprising the additional step of selecting one of a near-field collimating path and a far-field collimating path provided within the beam housing.

45. The method of claim 33, comprising the additional step of adjusting a position of a gimballed mirror to direct the beam emitted by the laser device under test into a test beam entry port of the beam housing.

46. The method of claim 33, comprising the additional step of adjusting a level of attenuation provided by a controllably variable attenuator to set a saturation level of the diagnostic camera.

47. The method of claim 33, comprising the additional step of adjusting a level of attenuation provided by a step-wise variable attenuator to set a saturation level of the wide-field camera.

* * * * *